(12) United States Patent
Zad Tootaghaj et al.

(10) Patent No.: US 12,737,230 B2
(45) Date of Patent: Sep. 15, 2026

(54) DMA TRANSFERS OF JOB DATA FROM AN ADAPTER TO PARALLEL PROCESSING UNIT (PPU) FRACTIONS

(71) Applicant: HEWLETT PACKARD ENTERPRISE DEVELOPMENT LP, Spring, TX (US)

(72) Inventors: Diman Zad Tootaghaj, Milpitas, CA (US); Yunming Xiao, Ypsilanti, MI (US); Aditya Dhakal, Santa Clarita, CA (US); Puneet Sharma, Palo Alto, CA (US); Lianjie Cao, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 297 days.

(21) Appl. No.: 18/765,445

(22) Filed: Jul. 8, 2024

(65) Prior Publication Data

US 2026/0010406 A1 Jan. 8, 2026

(51) Int. Cl.

| | |
|---|---|
| ***G06F 9/48*** | (2006.01) |
| ***G06F 9/50*** | (2006.01) |
| ***G06F 15/173*** | (2006.01) |

(52) U.S. Cl.

CPC .......... *G06F 9/5038* (2013.01); *G06F 9/5016* (2013.01); *G06F 15/17331* (2013.01)

(58) Field of Classification Search

CPC ...... G06F 9/544; G06F 9/5027; G06F 9/3856; G06F 9/4881; G06F 9/45533; G06F 9/3885; G06F 9/4875; G06F 9/5038; G06F 9/5016; G06F 15/17331; G06T 1/20

See application file for complete search history.

(56) References Cited

U.S. PATENT DOCUMENTS

| | | | | |
|---|---|---|---|---|
| 7,533,384 B2 * | 5/2009 | Chan | G06F 9/4843 709/201 |
| 7,620,530 B2 * | 11/2009 | Bordes | G06F 15/7864 703/2 |
| 9,128,739 B1 | 9/2015 | Juels et al. | |

(Continued)

OTHER PUBLICATIONS

Cho et al., SLA-Driven ML Inference Framework for Clouds with Heterogeneous Accelerators, Proceedings of Machine Learning and Systems (MLSys), 2022, 13 pages.

(Continued)

*Primary Examiner* — Andy Ho

(74) *Attorney, Agent, or Firm* — Trop, Pruner & Hu, P.C.

(57) ABSTRACT

In some examples, an adapter is for use with a system including a plurality of physical processing units (PPUs). The adapter includes a network interface to communicate over a network an adapter controller to receive, over the network, job data for multiple jobs to be executed on PPU fractions of one or more physical PPUs, and determine that first job data of a first job of the multiple jobs is to be provided to a first PPU fraction of the PPU fractions, and that second job data of a second job of the multiple jobs is to be provided to a second PPU fraction of the PPU fractions. The adapter controller initiates a direct memory access (DMA) transfer of the first job data to a first PPU memory buffer of the first PPU fraction, and a DMA transfer of the second job data to a second PPU memory buffer of the second PPU fraction.

20 Claims, 9 Drawing Sheets

(56) References Cited

U.S. PATENT DOCUMENTS

| | | | |
|---|---|---|---|
| 10,313,261 | B1 | 6/2019 | Walton, III |
| 10,325,343 | B1 | 6/2019 | Zhao et al. |
| 10,430,991 | B2 | 10/2019 | Ma et al. |
| 11,055,809 | B2 | 7/2021 | Shah et al. |
| 11,449,963 | B1 | 9/2022 | Beeler et al. |
| 11,494,228 | B2 * | 11/2022 | Suh ........................ G06F 9/4881 |
| 11,651,470 | B2 | 5/2023 | Zad Tootaghaj et al. |
| 11,915,041 | B1 * | 2/2024 | Tanach .................. G06F 9/4881 |
| 2004/0194055 | A1 | 9/2004 | Galloway et al. |
| 2010/0287560 | A1 | 11/2010 | Neft |
| 2011/0041131 | A1 | 2/2011 | Srivatsa et al. |
| 2012/0017213 | A1 | 1/2012 | Hunt et al. |
| 2012/0130554 | A1 | 5/2012 | Jain et al. |
| 2012/0254439 | A1 | 10/2012 | Yamasaki et al. |
| 2013/0238785 | A1 | 9/2013 | Hawk et al. |
| 2013/0275382 | A1 | 10/2013 | Chi et al. |
| 2014/0298338 | A1 | 10/2014 | Doi |
| 2015/0039793 | A1 | 2/2015 | Rossetti |
| 2015/0052531 | A1 | 2/2015 | Helak et al. |
| 2016/0019937 | A1 | 1/2016 | Arora et al. |
| 2016/0077871 | A1 | 3/2016 | Kaplan et al. |
| 2016/0246625 | A1 | 8/2016 | Katsura et al. |
| 2017/0255496 | A1 | 9/2017 | Deng et al. |
| 2018/0060996 | A1 | 3/2018 | Tunuguntla et al. |
| 2018/0089881 | A1 | 3/2018 | Johnson |
| 2018/0373570 | A1 | 12/2018 | Xu et al. |
| 2019/0050163 | A1 | 2/2019 | Dewey et al. |
| 2019/0324822 | A1 | 10/2019 | Gottin et al. |
| 2020/0019311 | A1 | 1/2020 | Zolotow et al. |
| 2020/0090001 | A1 | 3/2020 | Zargahi et al. |
| 2020/0219464 | A1 | 7/2020 | Callway et al. |
| 2020/0409733 | A1 | 12/2020 | Sankaran et al. |
| 2021/0004273 | A1 | 1/2021 | You et al. |
| 2021/0026672 | A1 | 1/2021 | Kurkure et al. |
| 2021/0026696 | A1 | 1/2021 | Chen et al. |
| 2021/0110506 | A1 | 4/2021 | Prakash et al. |
| 2021/0216365 | A1 | 7/2021 | Zhao et al. |
| 2021/0216375 | A1 | 7/2021 | Sivaraman et al. |
| 2021/0256418 | A1 | 8/2021 | Creedon et al. |
| 2021/0373972 | A1 | 12/2021 | Kurkure et al. |
| 2022/0091894 | A1 | 3/2022 | Xia et al. |
| 2022/0188965 | A1 | 6/2022 | Li et al. |
| 2022/0229701 | A1 | 7/2022 | Zhang et al. |
| 2022/0237014 | A1 | 7/2022 | Kurkure et al. |
| 2022/0414817 | A1 | 12/2022 | Zad Tootaghaj et al. |
| 2023/0089925 | A1 | 3/2023 | Cho et al. |
| 2023/0099950 | A1 | 3/2023 | Porter |
| 2023/0102063 | A1 | 3/2023 | Wong et al. |
| 2023/0155958 | A1 | 5/2023 | An et al. |
| 2023/0195972 | A1 | 6/2023 | Desai et al. |
| 2023/0297406 | A1 | 9/2023 | Rogers et al. |
| 2023/0297421 | A1 | 9/2023 | Cowperthwaite et al. |
| 2023/0418467 | A1 | 12/2023 | Ezrielev et al. |
| 2023/0418826 | A1 | 12/2023 | Tanigawa et al. |
| 2024/0056491 | A1 | 2/2024 | Kamaraju et al. |
| 2025/0355716 | A1 * | 11/2025 | Duluk, Jr. ............. G06F 9/5038 |

OTHER PUBLICATIONS

Crankshaw et. al., "Clipper: A low-latency online prediction serving system." NDSI, 2017, 17 pages.
Dakkak et. al., "Trims: Transparent and isolated model sharing for low latency deep learning inference in function-as-a-service." CLOUD, 2018, 13 pages.
Deepomatic, Fork of the NVIDIA device plugin for Kubernetes with support for shared GPUs by declaring GPUs multiple times downloaded Feb. 6, 2023 (6 pages).
Devlin et al., "BERT: Pre-training of Deep Bidirectional Transformers for Language Understanding", 2019, 16 pages.
DPDK Project, About DPDK downloaded Jun. 22, 2024 (5 pages).
Github, alibaba/clusterdata, clusterdata/cluster-trace-gpu-v2020 downloaded Jun. 22, 2024 (20 pages).
Github, AliyunContainerService / gpushare-device-plugin, GPU Sharing Device Plugin for Kubernetes Cluster downloaded Jun. 22, 2024 (2 pages).
Github, AliyunContainerService / gpushare-device-plugin, GPU Sharing Device Plugin in Kuberntes downloaded Feb. 6, 2023 (2 pages).
Github, Deepomatic / shared-gpu-nvidia-k8s-device-plugin downloaded Jun. 22, 2024 (5 pages).
Github, intel/linux-intel-its downloaded Jun. 22, 2024 (5 pages).
Google for Developers, About OR-Tools, Jan. 2023 (2 pages).
Hayashi et al., "ESPnet-TTS: Unified, Reproducible, and Integratable Open Source End-to-End Text-to-Speech Toolkit", 2020, 5 pages.
He et al., "Deep Residual Learning for Image Recognition", In Proceedings of the IEEE conference on computer vision and pattern recognition, 2016, 9 pages.
Hsu et al., Simultaneous and Heterogenous Multithreading, MICRO '23, Oct. 28-Nov. 1, 2023 (16 pages).
ImageNet, About ImageNet downloaded Jun. 22, 2024 (2 pages).
Intel, CPU vs. GPU: Making the Most of Both downloaded Feb. 6, 2023 (4 pages).
Junguk, et al., "SLA-Driven ML Inference Framework For Clouds With Heterogeneous Accelerators." Proceedings of Machine Learning and Systems 4 (2022), 13 pages.
Kubernetes, Manage clusters with different types of GPUs downloaded Jun. 22, 2024 (3 pages).
Marvell, Marvell LiquidIO III, Sep. 2020 (3 pages).
Murray, et al., "tf. data: a machine learning data processing framework", Proceedings of the VLDB Endowment, 2021, 16 pages.
NVIDIA Bluefield-3 DPU Programmable Data Center Infrastructure On-A-Chip, Dec. 2021 (2 pages).
NVIDIA Bluefield-3 Networking Platform Datasheet, Nov. 2023 (2 pages).
NVIDIA Converted Accelerators downloaded Jun. 22, 2024 (8 pages).
NVIDIA Corporation, "NVIDIA TensorRT", available online at <https://web.archive.org/web/20230921054928/https://developer.nvidia.com/tensorrt>, Sep. 21, 2023, 5 pages.
NVIDIA DOCA Comm Channel, Programming Guide, May 2023 (31 pages).
NVIDIA DOCA DMA docs downloaded Jun. 22, 2024 (16 pages).
NVIDIA DOCA RDMA downloaded Jun. 22, 2024 (59 pages).
NVIDIA GPUDirect, Enhancing Data Movementand Access for GPUs downloaded Jun. 22, 2024 (5 pages).
NVIDIA Mellanox Innova-2 Flex Open Programmable SmartNIC downloaded Jun. 22, 2024 (6 pages).
NVIDIA Multi-Instance GPU User Guide, Mar. 2024 (58 pages).
NVIDIA, "NVIDIA Triton Inference Server", available online at <https://docs.nvidia.com/deeplearning/triton-inference-server/user-guide/docs/index.html>, Jan. 18, 2024, 2 pages.
NVIDIA, Multi-Process Service, Feb. 2024 (38 pages).
NVIDIA, Multi-Process Service, Oct. 2022 (37 pages).
NVIDIA, NVIDIA Bluefield-2 DPU Datasheet, Data Center Infrastructure on a Chip, Nov. 2023 (2 pages).
Paras Jain et. al., "Dynamic Space-Time Scheduling for GPU Inference." arXiv preprint, 2018, 9 Pages.
Paras Jain et. al., "The OoO VLIW JIT Compiler for GPU Inference." arXiv preprint, 2019, 7 pages.
Romero et al., "INFaaS: A Model-less and Managed Inference Serving System", Dec. 15, 2020, 16 pages.
Sapio et al., "Scaling Distributed Machine Learning with In-Network Aggregation", Proceedings of the 18th USENIX Symposium on Networked Systems Design and Implementation, 2021, 25 pages.
Schedule GPUs_Kubernetes last modified Oct. 18, 2022 (3 pages).
Sengupta et. al., "Multi-tenancy on GPGPU-based servers." 7th international workshop on Virtual-ization technologies in distributed computing, 2013, 8 Pages.
Skolnick et al., "AlphaFold 2: Why It Works and Its Implications for Understanding the Relationships of Protein Sequence, Structure, and Function", 2021, 8 pages.
Tootaghaj et al., U.S. Appl. No. 18/299,855 entitled Job Allocations to Graphics Processing Units With Tenant Isolation filed Apr. 13, 2023 (38 pages).

(56) References Cited

OTHER PUBLICATIONS

Tootaghaj et al., U.S. Appl. No. 18/765,440 entitled Job Allocations to Fractions of Parallel Processing Units (PPUs) filed Jul. 8, 2024 (63 pages).
Tootaghaj et al., U.S. Appl. No. 18/765,445 entitled Dma Transfers of Job Data From an Adapter to Parallel Processing Unit (PPU) Fractions filed Jul. 8, 2024 (64 pages).
Weng et al., "MLaaS in the Wild:Workload Analysis and Scheduling in Large-Scale Heterogeneous GPU Clusters", Apr. 4-6, 2022, 17 pages.
Wikipedia, CUDA, Stable release: 12.1.0 / Mar. 1, 2023 (23 pages).
Xiao et al., "Conspirator: SmartNIC-Aided Control Framework for ML Workloads Orchestration", 2023, 6 pages.
Yeh et. al., "Pagoda: Fine-grained gpu resource virtualization for narrow tasks." CM SIGPLAN Notices, 2017, 13 pages.
Zhou, et al., "Deep interest network for click-through rate prediction", In Proceedings of the 24th ACM SIGKDD international conference on knowledge discovery data mining, 2018, 9 pages.
NVIDIA, "The Run:ai Scheduler: concepts and principles", available online at <http://web.archive.org/web/20231209221226/https://docs.run.ai/latest/Researcher/scheduling/the-runai-scheduler/>, Dec. 9, 2023 23 pages.

* cited by examiner

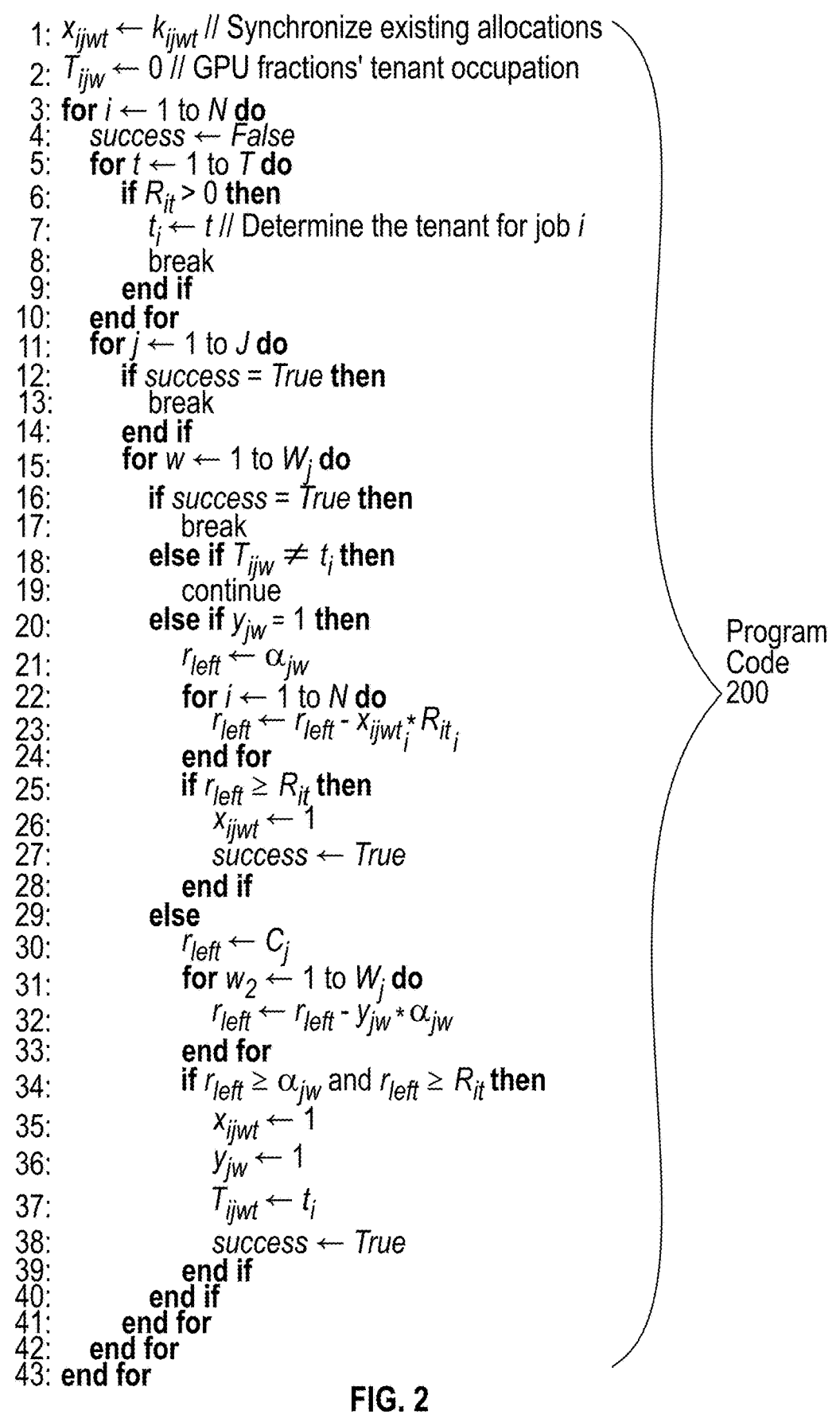

```
x_ijwt ← k_ijwt // Synchronize existing allocations
T_ijw ← 0 // GPU fractions' tenant occupation
for i ← 1 to N do
   success ← False
   for t ← 1 to T do
      if R_it > 0 then
         t_i ← t // Determine the tenant for job i
         break
      end if
   end for
   for j ← 1 to J do
      if success = True then
         break
      end if
      for w ← 1 to W_j do
         if success = True then
            break
         else if T_ijw ≠ t_i then
            continue
         else if y_jw = 1 then
            r_left ← α_jw
            for i ← 1 to N do
               r_left ← r_left - x_ijwt_i * R_it_i
            end for
            if r_left ≥ R_it then
               x_ijwt ← 1
               success ← True
            end if
         else
            r_left ← C_j
            for w_2 ← 1 to W_j do
               r_left ← r_left - y_jw * α_jw
            end for
            if r_left ≥ α_jw and r_left ≥ R_it then
               x_ijwt ← 1
               y_jw ← 1
               T_ijwt ← t_i
               success ← True
            end if
         end if
      end for
   end for
end for
```

Program Code 200

FIG. 2

DMA TRANSFERS OF JOB DATA FROM AN ADAPTER TO PARALLEL PROCESSING UNIT (PPU) FRACTIONS

BACKGROUND

Some computing systems include specialized processors or accelerators, which can be in the form of graphics processing units (GPUs), tensor processing units (TPUs), or neural processing units (NPUs), for example. A GPU, TPU, or NPU includes a relatively large quantity of processing elements that can execute computations in parallel.

BRIEF DESCRIPTION OF THE DRAWINGS

Some implementations of the present disclosure are described with respect to the following figures.

FIG. 2 is a schematic diagram of a program code to perform GPU job scheduling according to some examples.

Figure 1:
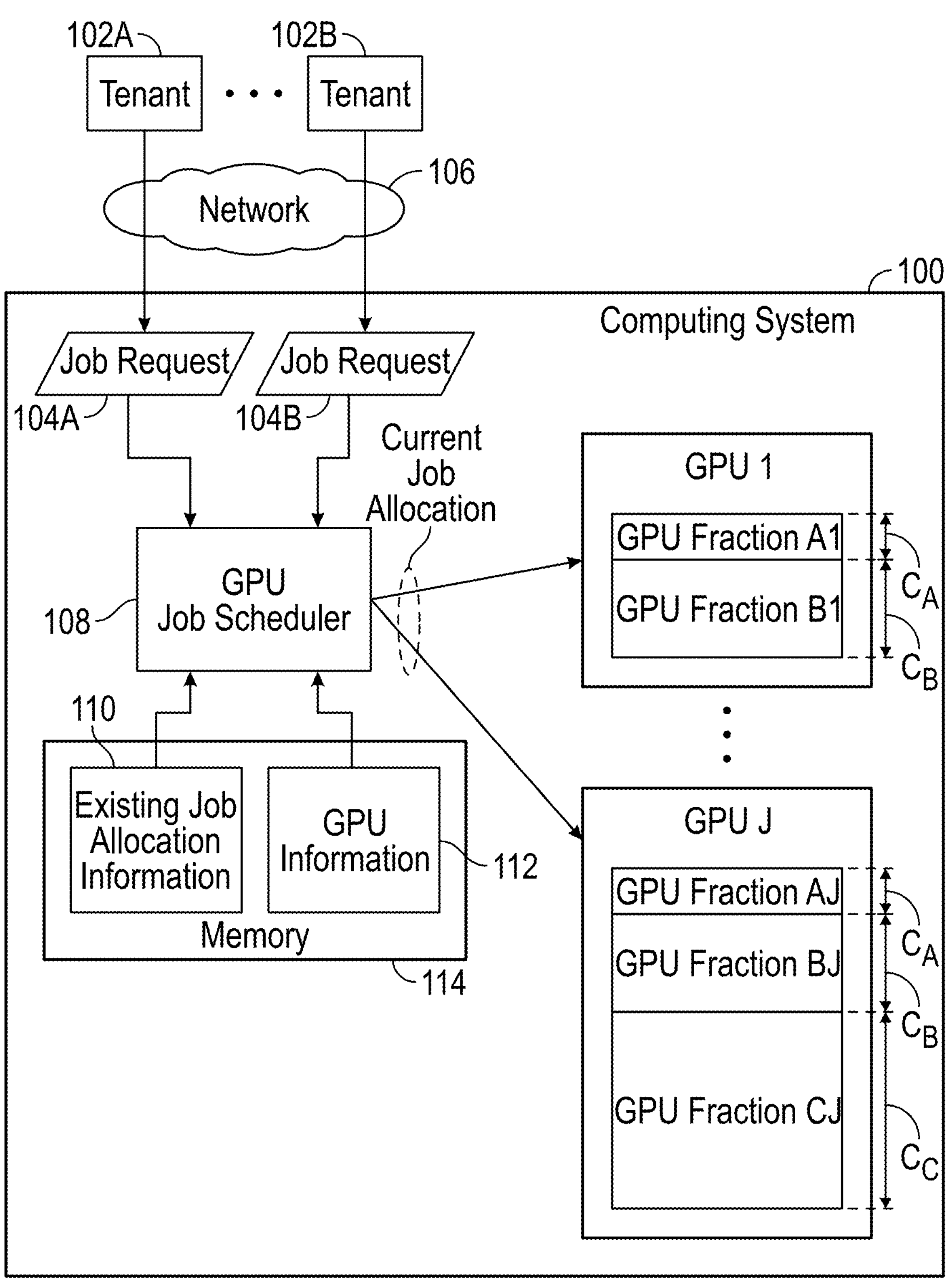
FIG. 1 is a block diagram of an arrangement including a computing system with a graphics processing unit (GPU) job scheduler and multiple GPUs on which jobs from multiple tenants can be allocated, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Specialized processors or accelerators are processing units that are separate and distinct from a central processing unit (CPU) of a computing system. While the CPU is used to execute primary machine-readable instructions such as an operating system (OS), system firmware, and application programs, the specialized processors or accelerators include a relatively large quantity of processing elements that can perform computations (e.g., repetitive computations) in parallel. Examples of specialized processors or accelerators include graphics processing units (GPUs), tensor processing units (TPUs), and neural processing units (NPUs). In the ensuing discussion, any of such specialized processors or accelerators can be referred to as parallel processing units (PPUs). Generally, a PPU includes multiple processing elements across which computation tasks of jobs can be allocated for execution in parallel. Within a computing system, a PPU is separate from the CPU of the computing system. In the ensuing discussion, reference is made to GPUs. However, the examples described are also applicable to other types of PPUs.

In using multiple GPUs to execute jobs requested by clients, multiple potential challenges can lead to sub-optimal and/or reduced performance of jobs on the GPUs. A scheduling challenge relates to scheduling of the jobs on the GPUs. A data communication challenge relates to communicating data of jobs to the GPUs. Some techniques seek to address the data communication challenge by reducing barriers relating to communications of data to GPU memories in the GPUs. For example, a remote direct memory access (RDMA) technique can be used to allow for direct reads or writes of data in a GPU memory over a network by a remote client. However, the ability of a client to directly write data of a job to a GPU memory may be inconsistent with scheduling being performed by a GPU job scheduler that seeks to schedule jobs across GPUs in a manner that improves performance and/or reduces costs. The client may directly write data of a given job to a first GPU, while the GPU job scheduler may select a different second GPU to execute the given job. As a result, the GPU job scheduler may have to perform GPU scheduling of jobs that considers where data of the jobs have been written to by clients, which can lead to a sub-optimal allocation of jobs to GPUs. A sub-optimal allocation of jobs to GPUs refers to an allocation that has one or more of reduced performance and increased cost when compared to another possible allocation of the jobs to GPUs. The sub-optimal allocation of jobs reduces job scheduling effectiveness. Thus, although the RDMA technique can address the data communication challenge, the RDMA technique may be inconsistent with addressing the scheduling challenge.

On the other hand, techniques that seek to address the scheduling challenge may be inconsistent with the data communication challenge. For example, using a central GPU job scheduler that enforces where client requests are directed can increase data communication latency. In a specific example, the central GPU job scheduler may execute on a CPU, and job requests from clients as well the data for the jobs are received at the CPU. Once the GPU job scheduler selects a GPU to execute a job, the CPU then offloads the job data to the selected GPU. When there are a large quantity of jobs and large amounts of job data, the CPU quickly becomes a bottleneck that slows down the transfer of the job data to GPUs in response to allocations of the jobs to the GPUs.

Another aspect of the scheduling challenge flows from the fact that different jobs may have different characteristics. A first type of job may run more effectively on a first type of GPU resource than another type of GPU resource, while a second type of job may run more effectively on a type of GPU resource different from the first type of GPU resource. If a job scheduler allocates the different jobs having different characteristics to run on GPU resources of a common type, then inefficiencies may arise if insufficient or excessive GPU resources are allocated to any given job. For example, a job scheduler may assign a job to an entire physical GPU. However, the entire physical GPU may have excess capacity not used by the job, which would lead to GPU capacity not being used (i.e., wasted) if other jobs cannot share the physical GPU.

A further challenge in executing jobs on GPUs is that isolation between jobs may be desirable (this further challenge is referred to as a "data isolation challenge"). For example, a first job may be associated with a first tenant, while a second job may be associated with a different second tenant. If the first and second jobs are executed on common GPU resources, the data of the first job may be available to the second job, and vice versa. As a result, one tenant may be able to access data (or results of processing of data) of another tenant, which can violate privacy goals.

In accordance with some implementations of the present disclosure, techniques or mechanisms are provided that are able to address all or some combination of the foregoing challenges, including the scheduling challenge, the data communication challenge, and the data isolation challenge, that are associated with executing jobs on PPUs, such as GPUs, TPUs, or NPUs. A job scheduler according to some examples of the present disclosure can schedule jobs on PPU fractions, where a PPU fraction refers to a partition of a PPU. The PPU may be partitioned into multiple PPU fractions. Each PPU fraction includes a compute resource and a memory resource. To enforce data isolation, the compute resource and the memory resource of a first PPU fraction of a given PPU is separate (and isolated) from the compute resource and the memory resource of a second PPU fraction of the given PPU. To address the scheduling challenge and the data isolation challenge, the job scheduler performs a job allocation according to a cost reduction objective that seeks to reduce (e.g., minimize) costs associated with the execution of jobs on PPUs, while also enforcing data isolation between jobs, such as jobs requested by different tenants. Additionally, for more efficient usage of PPU resources, heterogeneous PPU resources can be allocated to jobs of different characteristics. For example, a first type of job may be allocated to a first collection of PPU fractions, while a second type of job may be allocated to a second collection of PPU fractions, where compute and memory resources differ between the first and second collections of PPU fractions. For example, the first collection of PPU fractions may have more PPU fractions than a second collection of PPU fractions, so that the first type of job makes use of allocated PPU resources of a first capacity, and the second type of job makes use of allocated PPU resources of a second capacity that is different from the first capacity.

To address the data communication challenge, an adapter separate from PPUs and a CPU of a computing system is used as a job scheduling control plane that ingests data of jobs to be performed on the PPUs, and runs a job scheduler that schedules the jobs on selected PPUs. The adapter is provided between the PPUs and a network over which job requests are received from clients. The adapter includes an adapter memory to temporarily store job data that is to be distributed to PPUs according to allocations of jobs to the PPUs performed by the job scheduler. The temporary storing of job data allows the job scheduler to make its job allocation decisions before transferring the job data to selected PPUs.

The adapter bypasses the CPU of the computing system when transferring data from clients to PPU memories for improved data throughput that avoids the CPU as a bottleneck. The job scheduler according to some examples of the present disclosure also bypasses the CPU by performing job scheduling functions on the adapter rather than the CPU.

An "adapter" can refer to any electronic component with a processing resource on which machine-readable instructions (including those of the job scheduler according to some examples of the present disclosure) are executable to perform programmed tasks. An example of an adapter is a smart network interface controller (NIC). A smart NIC can perform network interface functions for communicating data over a network. More specifically, the smart NIC includes a signal transceiver to transmit and receive signals over the network, and protocol layers to communicate data according to respective communication protocols.

In other examples, other types of adapters can be used, including any electronic component that is able to receive job data from a client before the job data reaches the CPU of a computing system, and that includes a processing resource to execute a job scheduler.

In some examples, the adapter may be part of the computing system that includes PPUs. In other examples, the adapter may be outside the computing system. For example, the adapter may be part of a network switch, a server computer, or any other electronic device between clients and the computing system with PPUs on which jobs requested by the clients can be scheduled for execution. A "client" can refer to a human, a program, or a machine.

The PPU fractions of a PPU can include respective memory resources. In the ensuing discussion, a memory resource in a PPU fraction can include a PPU memory buffer. If the PPU is a GPU, then a GPU fraction includes a GPU memory buffer. A PPU memory buffer is a portion of the PPU memory resources that is separately identifiable and that can be used to store job data of a job during execution of the job by a compute resource of a PPU fraction. In accordance with some implementations of the present disclosure, the adapter is able to perform direct memory access (DMA) transfer of job data from the adapter memory to one or more PPU memory buffers. For example, if there are multiple jobs scheduled for execution on different PPU fractions, the adapter can perform a DMA transfer of job data of a first job to a PPU memory buffer in a first PPU fraction, and a DMA transfer of job data of a second job to a PPU memory buffer in a second PPU fraction. The ability to perform DMA transfers of data into multiple PPU memory buffers from the adapter allows for job data to be quickly and efficiently transferred to PPU fractions where respective jobs are to be executed, as scheduled by the job scheduler.

Additionally, in some examples of the present disclosure, the adapter is able to convert job data according to a first format communicated over a network with a client to converted job data according to a second format used in a PPU. For example, the first format includes a serial format, and the second format is a complex format (more complex than the serial format). In some examples, the second format includes a linked list of data, a hierarchical arrangement (e.g., tree arrangement) of data, data according to a format of a program, or any other non-serial format.

Examples of jobs that can be scheduled on PPUs include jobs for machine learning (ML) workloads (including artificial intelligence (AI) workloads, neural network workloads, scientific workloads, etc.). An ML workload includes complex computations of an ML model, including computations associated with training the ML model and computations associated with applying the trained ML model to a data set to produce predictions.

Other examples jobs that can be scheduled on PPUs include jobs for graphics processing, animation, a machine perception (e.g., to perform speech recognition, facial recognition, object recognition, etc.), natural language processing, or any other computations that may be distributed across processing elements of PPUs for parallel execution. Examples of processing elements include arithmetic logic units (ALUs), processing cores for performing matrix computations, or other types of processing cores.

The following includes a Job Scheduler section that describes a job scheduler according to some implementations of the present disclosure, and an Adapter-Assisted Job Scheduling Control Plane section that describes use of an adapter to implement a job scheduling control plane for GPUs (or other types of PPUs).

Job Scheduler

FIG. 1 is a block diagram of an arrangement including a computing system 100 according to some examples of the present disclosure. The computing system 100 can be implemented with one or more computers.

The computing system 100 provides computing resources accessible by clients of multiple (two or more) tenants 102A and 102B. For example, the computing system 100 can include resources that are provided as-a-Service (aaS), such as in a cloud or another computing environment. The resources of the computing system 100 are available to the tenants 102A and 102B on demand (i.e., the resources are made available to clients of the tenants 102A and 102B in response to requests by the clients). A "client" can refer to a human, a program (such as a containerized application program or any other type of program), or a machine (such as a computer or another type of machine).

A "tenant" refers to a group of clients, such as clients associated with an enterprise (e.g., a business concern, a government agency, an educational organization, a charitable organization, an individual, etc.), that is able to use resources (e.g., GPUs) owned or managed by another entity (referred to as a "service provider").

The resources of the computing system 100 can include processing resources, communication resources, storage resources, program resources, or any other types of resources. An example of a processing resource is a GPU. As shown in FIG. 1, the computing system 100 includes GPU 1 to GPU J, where J is a natural number greater than or equal to 1. Each GPU 1 to GPU J is a physical GPU, which has compute and memory resources that can be divided into GPU fractions. A GPU fraction includes a compute resource and a memory resource. The memory resource in some examples may include multiple memory levels, including a cache memory and a lower level memory that is larger in size than the cache memory. In some examples, there may be multiple levels of cache memories in addition to the lower level memory. To enforce data isolation, a first compute resource and a first memory resource of a first GPU fraction of a given GPU is separate (and isolated) from a second compute resource and a second memory resource of a second GPU fraction of the given GPU. The first compute resource and the first memory resource of the first GPU fraction is separate and isolated from the second compute resource and the second memory resource of the second GPU fraction if a first task executed on the first compute resource that accesses data in the first memory resource is unable to access data of a second task, where the second task is executed on the second compute resource that accesses data in the second memory resource. The first task and the second task are also able to execute in parallel on the respective first and second compute resources.

In the example of FIG. 1, GPU 1 is partitioned into GPU fractions A1 and B1, where GPU fraction A1 has a capacity $C_A$, and GPU fraction B1 has a capacity $C_B$ that is different from capacity $C_A$. A "capacity" of a GPU fraction refers to either of or both a compute capacity or memory capacity. A compute capacity represents how many computations can be performed per unit time by the GPU fraction. The compute capacity can be based on how many processing elements are included in the GPU fraction. A memory capacity represents how much data can be stored by the memory resource of the GPU fraction.

GPU J is partitioned into GPU fractions AJ, BJ, and CJ, where GPU fraction AJ has a capacity $C_A$, GPU fraction BJ has a capacity $C_B$, and GPU fraction BJ has a capacity $C_C$, and where capacity $C_A$, capacity $C_B$, capacity $C_C$ are different from one another. Although specific quantities of GPU fractions having respective capacities are depicted in FIG. 1, in other examples, a GPU can include a different quantity of GPU fractions. A GPU may include multiple GPU fractions of the same capacity. More generally, a GPU can include multiple collections of GPU fractions, where one collection of GPU fractions includes one or more GPU fractions of a first capacity that is different from a second capacity of another collection of GPU fractions that includes one or more GPU fractions. GPU fractions are able to perform concurrent processing of jobs (e.g., a first job can execute on a first collection of GPU fractions in parallel with a second job on a second collection of GPU fractions).

In examples where a GPU is supplied by NVIDIA, a GPU fraction can include a Multi-Instance GPU (MIG) instance. Multiple MIG instances of different capacities may be provided in a GPU. In further examples, a GPU can be from another vendor, such as Advanced Micro Devices (AMD), Intel, and so forth.

In examples where MIG instances of NVIDIA GPUs are employed, the compute resource of each MIG instance has separate and isolated data paths to the respective memory resource in the GPU, so that memory isolation can be achieved. Jobs can be scheduled on MIG instances as if the MIG instances were physical GPUs.

In some examples, a job can be run as a collection of one or more containers (e.g., a Kubernetes container or another type of container) on a GPU fraction. A container is a type of virtual computing entity. In other examples, jobs can run as non-containerized processes, e.g., as threads or other types of tasks.

Clients of the tenants 102A and 102B are able to submit respective job requests 104A and 104B to the computing system 100 over a network 106. The network 106 can be a local area network (LAN), a wide area network (WAN), the Internet, or any other type of communication link. Each job request is to request the execution of a job on resources of the computing system 100, including GPU 1 to GPU J. A job request can include command information specifying a job to be performed, and job data on which workload of the job is to be applied. A job can refer to any collection of data processing tasks. In some examples, a job request can be included in a data structure, such as a file, e.g., a Yet Another Markup Language (YAML) file or another type of file. In other examples, other types of data structures can be used for job requests. More than one job request from a given tenant can be included in one data structure, e.g., one YAML file. In further examples, a tenant can submit multiple data structures over time for more job requests that are to use the shared computing resources.

The job requests 104A and 104B are received by a GPU job scheduler 108, which allocates a job specified by a job request to one or more GPUs in the computing system 100. The GPU job scheduler 108 can be implemented as machine-readable instructions executable in the computing system 100. In other examples, the GPU job scheduler 108 may be outside the computing system 100.

In some examples, GPU 1 to GPU J include heterogeneous GPUs (e.g., one or more of the GPUs are different from one or more other GPUs). For example, a first collection of GPUs is provided by a first GPU manufacturer, and a second collection of GPUs is provided by a different second manufacturer. Configurations of GPUs from different manufacturers may be different. For example, GPUs from different manufacturers may have different processing capacities, execute with clocks of different operating speeds, support different quantities of GPU fractions, or have other different characteristics. In further examples, different models of GPUs from the same manufacturer may have different configurations.

The GPU job scheduler 108 according to some implementations of the present disclosure is able to provide allocation of jobs to heterogeneous GPUs, while maintaining tenant isolation, reducing costs such as operational costs and migration costs, and satisfying any other constraints and/or objectives.

In response to the job requests 104A and 104B, the GPU job scheduler 108 determines an optimal allocation of jobs to GPU fractions of any or some combination of GPU 1 to GPU J. An "optimal" allocation of jobs to GPU fractions refers to an allocation that satisfies objective(s) and/or constraint(s) relating to job scheduling (discussed further below). In further examples, the GPU job scheduler 108 may determine a sub-optimal allocation of jobs to GPU fractions, such as based on use of a greedy algorithm (discussed further below).

In some examples, in response to receiving a new job request, the GPU job scheduler 108 determines a new allocation of jobs to GPU fractions, considering the new job's requirements and a previous allocation of existing jobs to GPU fractions. In further examples, in response to a completion of an existing job, the GPU job scheduler 108 determines a new allocation of jobs to GPU fractions, considering the completed job's requirements and an allocation of existing jobs to GPU fractions. In either case, the new allocation may result in migrating one or more existing jobs from one physical GPU or GPU fraction to another physical GPU or GPU fraction.

In accordance with some implementations of the present disclosure, the GPU job scheduler 108 maintains tenant isolation by preventing an allocation of more than one tenant's job(s) on the same GPU fraction. Note that it is possible to schedule jobs of multiple tenants on the same GPU, but the jobs of the multiple tenants are scheduled on respective different GPU fractions of the GPU. In some examples, the GPU job scheduler 108 can provide full tenant isolation (i.e., no two tenants should share the same GPU fraction) while minimizing the migration cost and operational costs.

In some examples, the GPU job scheduler 108 formulates a problem of optimal GPU allocation into a mixed integer linear programming problem based on input variables. The GPU job scheduler 108 includes a solver (or is able to access the solver that is separate from the GPU job scheduler 108). In some examples, the solver determines an optimal solution for the formulation and returns a set of output data representing an allocation of a job to one or more GPU fractions of one or more GPUs. Alternatively, the GPU job scheduler 108 can also implement the greedy algorithm that solves the problem sub-optimally.

The solver can be implemented with an integer linear programming solver, such as the Gurobi optimization toolkit (commercially available from Gurobi Optimization, LLC); the CPLEX Optimizer (commercially available from IBM Corporation); or the linear programming "OR" tool (available as open-source software from Google), and so forth.

The GPU job scheduler 108 is iteratively invoked to allocate jobs to GPU fractions in response to new job requests and/or completions of existing jobs. In some examples, the GPU job scheduler 108 employs a bin-packing-based GPU scheduling technique that provides tenant isolation while minimizing operational and migration costs and satisfying any other objective(s) and/or constraint(s). In such examples, the GPU scheduling problem is a bin-packing problem where bins can represent GPU fractions, and an item to be placed in a bin can represent a job (or a portion of the job).

The job scheduling by the GPU job scheduler 108 is incremental in nature in that the GPU job scheduler 108 iteratively updates the allocation of jobs to GPU fractions as events occur, including the receipt of a new job or the completion of an existing job. The GPU job scheduler 108 is able to perform online GPU scheduling to find a feasible solution for each GPU allocation problem iteration. The GPU scheduling is "online" in that the GPU scheduling is performed by the GPU job scheduler 108 as job requests are received and/or jobs are completed.

The GPU job scheduler 108 receives the following input information: a job request (e.g., 104A or 104B), existing job allocation information 110 representing an existing allocation of existing jobs to GPU fractions (made in a prior job scheduling decision of the GPU job scheduler 108), and GPU information 112 specifying characteristics of GPU 1 to GPU J. The existing job allocation information 110 and the GPU information 112 are stored in a memory 114 of the computing system 100. The memory 114 is implemented using one or more memory devices.

The received information is in the form of various variables. The following variable is part of a job request: $R_{it}$ representing a requested compute resource for job i by tenant t, where $i \in [1, N]$ and $t \in [1, T]$, where $N \geq 1$ (represents the number of jobs) and $T \geq 1$ represents the number of tenants. The requested compute resource for job i of tenant t is represented by $R_{it}$ which refers to a compute resource amount, which can be expressed as a percentage or fractional value, for example. The requested compute resource amount may be satisfied using one or more GPU fractions.

The following variables are part of the GPU information 112: J, $W_j$ where $j \in [1]$, $C_j$, $\alpha_{jw}$, and $m_i$. The variable J represents the total number of GPUs in the computing system 100. Each GPU j includes $W_j$ fractions. It is assumed there is non-overlapping isolation of computing and memory resources among GPU fractions, such as NVIDIA MIG instances. $W_j$ can vary for different GPU types, such as GPUs from different GPU manufacturers or GPUs of different models from the same GPU manufacturer.

The variable C; represents the total capacity of GPU j. The scheduling decision by the GPU job scheduler 108 imposes constraints to ensure that the total resource usage of selected GPU fractions on GPU j does not exceed $C_j$.

The variable $\alpha_{jw}$ represents the compute resource of the w-th fraction ($w \in [1, W_j]$) of GPU j. This compute resource of the w-th fraction of GPU j can be represented as a percentage or a fractional value, for example. The variable $m_i$ represents a migration cost to migrate job i ($i \in [1, N]$) from one GPU to another GPU.

The following variable is part of the existing job allocation information 110: $k_{ijtw}$. The binary variable $k_{ijtw}$ represents the existing assignment of jobs to GPU fractions in the computing system 100, or more specifically, whether job i for tenant t has been assigned to the w-th fraction of GPU j. A binary variable can be set to "0" or "1." For example, $k_{ijtw}$ is set to "1" to indicate that job i for tenant t has been assigned to the w-th fraction of GPU j by an existing job allocation, and to "0" to indicate that job i for tenant t has not been assigned to the w-th fraction of GPU j by the existing job allocation.

The following variables are decision variables output by the GPU job scheduler 108 based on a current job scheduling decision made by the GPU job scheduler 108: $Y_j$, $y_{jw}$, $x_{ijtw}$, and $\delta_i$.

The binary decision variable $Y_j$ indicates whether GPU j has been assigned to at least one job. For example, $Y_j$ is set to "1" to indicate that GPU j has been assigned to at least one job, and to "0" to indicate that GPU j has not been assigned any job. Stated differently, $Y_j$ indicates whether GPU j has any job assignments. Note that if $Y_j$ is set to "1," then GPU j would have to be powered on (or otherwise activated), which increases the GPU operational cost.

The binary decision variable $y_{jw}$ indicates whether the current job scheduling decision has allocated at least one job to the w-th fraction of GPU j. For example, $y_{jw}$ is set to "1" to indicate that the w-th fraction of GPU j has been allocated to at least one job, and to "0" to indicate that the w-th fraction of GPU j has not been allocated to at least one job.

The binary decision variable $x_{ijtw}$ represents job assignments made by the current job scheduling decision. For example, $x_{ijtw}$ is set to "1" to indicate that job i for tenant t has been assigned to the w-th fraction of GPU j by the current job scheduling decision, and to "0" to indicate that job i for tenant t has not been assigned to the w-th fraction of GPU j by the current job scheduling decision.

The binary decision variable $\delta_i$ indicates whether job i is to be migrated for optimal assignment in the current job scheduling decision. As noted above, the cost of migrating job i is denoted by $m_i$.

Table 1 lists some of the variables used by the GPU job scheduler 108.

TABLE 1

| Variable | Explanation |
|---|---|
| $R_{it}$ | Requested compute resource for job i by tenant t |
| J | Total number of GPUs |
| $W_j$ | Number of fractions in GPU j |
| $C_j$ | Total capacity of GPU j |
| $\alpha_{jw}$ | Compute resource of the w-th fraction of GPU j |
| $m_i$ | Migration cost for job i |
| $k_{ijwt}$ | Existing job assignment of job i for tenant t to the w-th fraction of GPU j |
| $Y_j$ | Decision variable to indicate whether GPU j has been assigned to at least one job |
| $y_{jw}$ | Decision variable to indicate whether the current job scheduling decision assigns at least one job to the w-th fraction of GPU j |
| $x_{ijwt}$ | Decision variable to indicate whether the current job scheduling decision assigns job i for tenant t to the w-th fraction of GPU j |
| $\delta_i$ | Decision variable to indicate whether the current job scheduling decision migrates job i to a different GPU |

As noted above, in some examples, the GPU job scheduler 108 employs a bin-packing-based GPU scheduling technique that provides tenant isolation while minimizing operational and migration costs and satisfying any other objective(s) and/or constraint. The bin-packing-based GPU scheduling technique solves a mixed integer problem (representing a formulation of the GPU allocation problem) according to Eq. 1 and constraints 1a to 1i below.

There are two objective functions in Eq. 1: (1) the left-hand side $\epsilon_1 \Sigma_j Y_j$ represents the weighted operational cost for powering on (or more generally activating) GPUs in the computing system 100 as part of job allocations, biased by the weight $\epsilon_1$; and (2) the right-hand side $\epsilon_2 \Sigma_i m_i \delta_i$ represents the weighted migration cost to migrate jobs as part of the job allocations, biased by the weight $\epsilon_2$. Eq. 1 seeks to minimize the weighted GPU operational cost (the first objective function) and minimize the weighted migration cost (the second objective function). The coefficients $\epsilon_1$ and $\epsilon_2$ are weights that adjust the respective first and second objective functions, where $\epsilon_1$ is the weight for the GPU operational cost and $\epsilon_2$ is the weight for the migration cost. The coefficients $\epsilon_1$ and $\epsilon_2$ may be set by an administrator, a program, or a machine. In some cases, the coefficients $\epsilon_1$ and $\epsilon_2$ may be dynamically varied over time or with changing conditions.

The GPU job scheduler 108 implements the allocations of jobs to GPU fractions based at least in part on the decision variables, $Y_j$, $y_{jw}$, $x_{ijtw}$, and $\epsilon_i$. In the constraints below, the symbol ∀ represents "for all." Thus, for example, in constraint 1a, $\forall i \in [1, N]$ represents for all i selected from the range of 1 to N.

$$\min_{x_{ijwt}} \epsilon_1 \sum_j Y_j + \epsilon_2 \sum_i m_i \delta_i \quad \text{(Eq. 1)}$$

$$\text{s.t. } \sum_t \sum_j \sum_w x_{ijwt} = 1, \forall i \in [1, N] \quad \text{(1a)}$$

$$\sum_j \sum_w x_{ijwt} \leq R_{it}, \forall i \in [1, N], \forall t \in [1, T] \quad \text{(1b)}$$

$$\sum_t \sum_i R_{it} \cdot x_{ijwt} \leq \alpha_{jw} \cdot y_{jw}, \forall j \in [1, W_j], \quad \text{(1c)}$$

$$\sum_w \alpha_{jw} \cdot y_{jw} \leq C_j, \forall j \in [1, J] \quad \text{(1d)}$$

$$Y_j \geq \frac{\sum_w y_{jw}}{N}, \forall j \in [1, J] \quad \text{(1e)}$$

$$\delta_i = 1 - \sum_t \sum_j \sum_w x_{ijwt} \cdot k_{ijwt}, \forall i \in [1, N] \quad \text{(1f)}$$

$$A_{jwt} \geq \frac{\sum_i x_{ijwt}}{N}, \forall j \in [1, J], \forall t \in [1, T], \forall w \in [1, W_j] \quad \text{(1g)}$$

$$\sum_t A_{jwt} \leq 1, \forall j \in [1, J], \forall w \in [1, W_j] \quad \text{(1h)}$$

$$\delta_i, x_{ijwt}, k_{ijwt}, A_{jwt}, y_{jw}, Y_j \in \{0, 1\} \quad \text{(1i)}$$

Relative values of the weights $\epsilon_1$ and $\epsilon_2$ control whether Eq. 1 prioritizes minimizing the GPU operational cost or migration cost. If $\epsilon_1>\epsilon_2$, then Eq. 1 prioritizes minimizing the GPU operational cost over the migration cost. On the other hand, if $\epsilon_1<\epsilon_2$, then Equation 1 prioritizes minimizing the migration cost over the operational cost. Note that in some cases, $\epsilon_1$ can be set equal to $\epsilon_2$ to place equal priority on minimizing the GPU operational cost and minimizing the migration cost.

Eq. 1 seeks to first minimize the operational cost or migration cost, depending upon which of $\epsilon_1$ and $\epsilon_2$ is greater. For example, if $\epsilon_1$ is greater than $\epsilon_2$, Eq. 1 minimizes the GPU operational cost (first objective function) when finding solutions for allocating jobs of a tenant to GPU fractions. If multiple solutions exist, the second objective function is minimized to select from the multiple solutions.

On the other hand, if $\epsilon_2$ is greater than $\epsilon_1$, Eq. 1 minimizes the migration cost (second objective function) when finding solutions for allocating jobs of a tenant to GPU fractions. If multiple solutions, the first objective function is minimized to select from the multiple solutions. In a specific example, if Eq. 1 places a higher priority on minimizing the migration cost and there exist two solutions that require the minimum possible job migration (for example, both solutions involve migrating one), then the second objective is applied to select from the two solutions. For example, if the first solution uses 5 GPUs, and the second solution uses 6 GPUs, minimizing the GPU operation cost would dictate that the first solution is selected.

Constraint 1a ensures the assignment of each job i only once. Constraint 1b enforces assignments solely for valid jobs where $R_{it}>0$.

Constraint 1c ensures that the cumulative resources allocated to jobs within the w-th fraction of GPU j ($\Sigma_t\Sigma_i R_{it}\cdot x_{ijwt}$) do not surpass the w-th fraction's total capacity ($\alpha_{jw}\cdot\gamma_{jw}$). Constraint 1d ensures that the cumulative resources allocated across all GPU fractions of GPU j ($\Sigma_w\alpha_{jw}\cdot\gamma_{jw}$) do not exceed the total capacity ($C_j$) of GPU j.

Constraint 1e serves to flag GPUs that have been assigned to at least one job. More specifically, if $Y_j=1$, then GPU j has been allocated at least one job. However, if $Y_j=0$, no job has been allocated to GPU j, and therefore, the system administrator, a program, or a machine can disable GPU j to save energy.

Constraint 1f determines whether job i is to be migrated to achieve optimal GPU allocation. The constraint, $\delta_i=1-\Sigma_t\Sigma_i\Sigma_w x_{ijwt}\cdot k_{ijwt}$, indicates that a migration of job i is to occur when a new allocation assigns job i to GPU x (represented by the decision variable $x_{ijwt}$) that is different from GPU y to which job i is assigned in an existing allocation (represented by the variable $k_{ijwt}$).

To enhance data security in GPU sharing within a multi-tenant context, constraints 1g and 1h use an intermediary variable $A_{jwt}$, and constraints 1g and 1h together ensure that all jobs assigned to the same GPU fraction originate from a single tenant. In constraint 1g, for each GPU j and for each tenant t, the GPU job scheduler 108 sums the binary decision variable $x_{ijt}$ for all jobs that are allocated to GPU j and for each tenant t ($\Sigma_i x_{ijwt}$). Note that $x_{ijwt}=1$ if job i has been allocated to the w-th fraction of GPU j for tenant t, and $x_{ijwt}=0$ if job i has not been allocated to the w-th fraction of GPU j for tenant t. According to constraint 1g, even if just one job that has been allocated to the w-th fraction of GPU j for tenant t, the summation of constraint 1g will be greater than 0. The sum ($\Sigma_i x_{ijwt}$) for all jobs that are allocated to the w-th fraction of GPU j and for tenant t is divided by N to normalize the sum to a value in the range of 0 to 1. If the sum ($\Sigma_i x_{ijwt}$) divided by N is 0, that indicates that no job for tenant t is assigned to the w-th fraction of GPU j. If the sum ($\Sigma_i x_{ijwt}$) divided by N is greater than 0 (but less than or equal to 1), then constraint 1g sets the tenant-job variable $A_{jwt}$ to 1.

Constraint 1h ($\Sigma_t A_{jwt}\leq 1$) then ensures that the tenant-job variable $A_{jwt}$ is less than or equal to 1, which ensures that jobs for more than one tenant cannot be allocated to the same w-th fraction of GPU j.

Constraint 1i comprehensively catalogs all binary variables implicated within the formulation. Specifically, constraint 1i specifies that each of the following variables has a binary value of 0 or 1: $\delta_i$, $x_{ijwt}$, $k_{ijwt}$, $A_{jwt}$, $y_{jw}$.

The solving of the GPU allocation problem represented by Eq. 1 and constraints 1a to 1i is an NP-hard problem that can be solved if the GPU job scheduler 108 has access to sufficient computing power. For example, the GPU job scheduler 108 can solve the optimization problem represented by Eq. 1 and constraints 1a to 1i using a branch and bound technique that solves optimization problems by breaking them down into smaller sub-problems and using a bounding function to eliminate sub-problems that cannot contain the optimal solution. However, for more complex instances of the problem or when there are a larger number of jobs and GPU fractions there is no guarantee that optimality can obtained within a specified time limit.

In another example, the GPU job scheduler 108 can solve the optimization problem represented by Eq. 1 and constraints 1a to 1i using a backtracking technique, which incrementally builds possible candidate solutions and abandons a candidate solution as soon as it is determined that the candidate solution cannot possibly be completed to finally become a valid solution.

In further examples, the GPU allocation problem can be simplified by using a greedy heuristic, which can ignore certain constraints, such as the job migration constraint represented by constraint 1f. Use of the greedy heuristic can allow the GPU job scheduler 108 to compute job allocations for jobs with a time complexity of $O(NJW_j)$, where N is the total number of jobs, J is the total number of GPUs, and $W_i$ is the total number of fractions among the GPUs.

FIG. 2 depicts program code 200 for GPU job scheduling performed by the GPU job scheduler 108 using a greedy heuristic. The greedy heuristic iterates through available GPU fractions and assigns jobs from tenants to the available GPU fractions in order.

Line 1 of the program code 200 synchronizes existing allocations (by setting $x_{ijwt}$ to $k_{ijwt}$), and line 2 of the program code 200 initializes variables $T_{ijw}$ representing an occupancy of the w-th fraction of GPU j by job i of tenant t.

Line 3 of the program code iterates through all jobs (i from 1 to N). Line 4 initializes success to False. The variable success indicates whether an allocation of a job to a GPU fraction has completed successfully. For each job i, lines 5-10 of the program code 200 determine the tenant $t_i$ who requested job i having a requested compute resource $R_{it}$ that is greater than 0 (checked at line 6 of the program code 200).

A section made up of lines 11-40 of the program code 200 iterates through all GPUs (j from 1 to J). Within this section, lines 15-39 of the program code 200 iterate through all fractions (w from 1 to $W_i$) of a GPU j until the current job i is successfully allocated (the variable success is set to True) (lines 12-14 and 16-17 of the program code 200).

While job i is not yet allocated, lines 18-19 of the program code 200 determine whether the current GPU fraction (w-th fraction of GPU j) is occupied by another tenant ($T_{ijw}\neq t_i$ at line 18 if true indicates that the current GPU fraction is occupied by another tenant). If the current GPU fraction is occupied by another tenant ($T_{ijw} \neq t_i$ at line 18 is true), the program code 200 proceeds to the next fraction w.

If the GPU fraction has been previously allocated to a job belonging to tenant $t_i$ ($T_{ijw} \neq t_i$ is not true and $y_{jw}$ is true as specified in line 20 of the program code 200), lines 21-24 of the program code 200 calculate whether there are available resources for job i. At line 21, $r_{left} \leftarrow \alpha_{jw}$ sets $r_{left}$ (which represents the resources left in the w-th fraction of GPU j) to $\alpha_{jw}$, which represents the compute resource of the w-th fraction of GPU j. If resources are available (as indicated in line 25 by $r_{left}$ being greater than $R_{it}$, which is the requested compute resource for job i by tenant t), lines 26-28 of the program code 200 assign job i to w-th fraction of GPU j (by setting $x_{ijwt}$ to 1 at line 26) and set success to True at line 27. Lines 22-24 of the program code 200 continue to assign successive jobs of tenant $t_i$ to the current w-th fraction of GPU j so long as sufficient resources are available ($r_{left} \leftarrow r_{left} - x_{ijwt} * R_{it}$ at line 23 and $r_{left} > R_{it}$ at line 25).

If the current w-th fraction of GPU j is currently unoccupied (not assigned to any job) (line 29), lines 30-34 of the program code 200 determine if current w-th fraction of GPU j can be initialized and whether the current w-th fraction of GPU j has sufficient resources for job i. If both conditions are met ($r_{left} > \alpha_{jw}$ and $r_{left} > R_{it}$), lines 35-38 of the program code 200 assign job i to current w-th fraction of GPU j (by setting $x_{ijwt}$ to 1 at line 35, setting $y_{jw}$ to 1 at line 36, setting $T_{ijw}$ to $t_i$ at line 38, and setting success to True at line 38).

Although the program code 200 of FIG. 2 generates just $x_{ijwt}$ as an output, it is noted that in other examples, other output decision variables such as $Y_j$ can also be generated without introducing any additional complexity.

According to some examples of the present disclosure, the GPU job scheduler 108 allows fine-grained GPU sharing by jobs of multiple tenants. The fine-grained GPU sharing refers to sharing of multiple GPU fractions of any given GPU. The GPU job scheduler 108 is able to assign jobs of different demands (e.g., with different values of $R_{it}$) to heterogeneous GPU resources, including GPU fractions of different capacities. Some jobs may be placed on GPU fractions of larger capacities, while other jobs may be placed on GPU fractions of smaller capacities, where a capacity of w-th fraction of GPU j is represented by $\alpha_{jw}$, for example. As a given job completes, the resources allocated to the given job becomes available, and the GPU job scheduler 108 can perform another job scheduling iteration that uses all available resources including the resources that have been freed up due to completion of the given job.

Also, flexibility is enhanced by adjusting the number of GPUs and the types of GPUs to be used for job allocation. This adjustment can be set by an administrator, a program, or a machine. Objective functions of the GPU allocation problem can be dynamically adjusted, such as by changing the coefficients $\epsilon_1$ and $\epsilon_2$.

The sharing of GPUs by tenants can be achieved while maintaining tenant isolation such that data leakage between tenants can be avoided and security between tenants is enhanced while satisfying other objective(s) and constraint(s). Data leakage may occur if multiple tenants share the same memory, which may occur if jobs of multiple tenants are assigned to the same GPU fraction.

Figure 3:
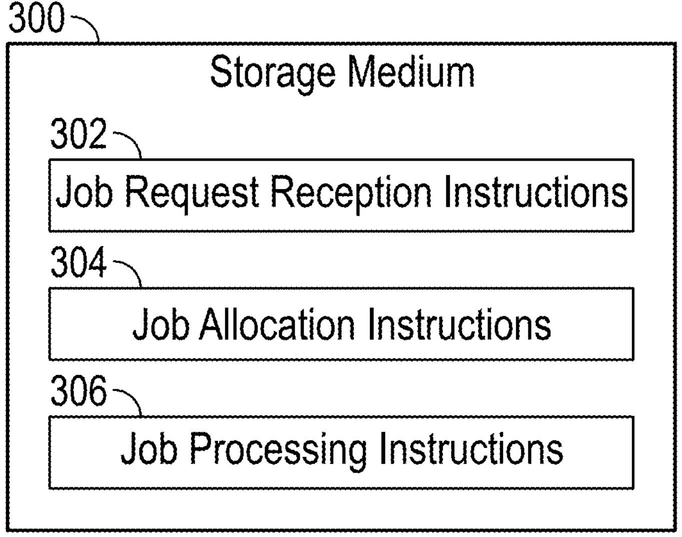
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a controller to perform various tasks. In some examples, the controller is part of an adapter that is separate from a CPU of a computing system (e.g., the computing system 100). For example, the adapter may include a smart NIC. The adapter may be part of the computing system or may be outside the computing system.

The machine-readable instructions include job request reception instructions 302 to receive a request to schedule a first job in a system including a plurality of physical PPUs, such as GPUs, TPUs, NPUs, and so forth. A physical PPU of the plurality of physical PPUs includes multiple PPU fractions (e.g., GPU fractions), and wherein a first PPU fraction of the multiple PPU fractions includes a first PPU compute resource and a first PPU memory resource that is separate and isolated from a second PPU compute resource and a second PPU memory resource of a second PPU fraction of the multiple PPU fractions.

The machine-readable instructions include job allocation instructions 304 to allocate the first job to a first collection of PPU fractions (including a single PPU fraction or plural PPU fractions) of the multiple PPU fractions based on an operational cost reduction objective (e.g., the first objection function of Eq. 1) to reduce a cost associated with a usage of the plurality of physical PPUs. For example, the operational cost reduction objective can seek to reduce the number of physical PPUs that are powered on or otherwise activated.

The machine-readable instructions include job processing instructions 306 to trigger processing of the first job according to the allocation of the first job to the first collection of PPU fractions, where data isolation is provided between the first job allocated to the first collection of PPU fractions and a second job allocated to a second collection of PPU fractions of the multiple PPU fractions. The triggering of the processing of the first job according to the allocation of the first job to the first collection of PPU fractions can include sending job data of the first job to the memory resource(s) of the first collection of PPU fractions.

In some examples, a compute capacity of the first PPU fraction of the physical PPU is different from a compute capacity of the second PPU fraction of the physical PPU.

In some examples, a memory capacity of the first PPU fraction of the physical PPU is different from a memory capacity of the second PPU fraction of the physical PPU.

In some examples, the data isolation is based on isolation of PPU compute resources and PPU memory resources between the first collection of PPU fractions and the second collection of PPU fractions.

In some examples, the controller is accessible by a plurality of tenants to use the plurality of physical PPUs, where the first job is requested by a first tenant, and the second job is requested by a second tenant different from the first tenant, and where tenant isolation is provided by allocating the first job to the first collection of PPU fractions of the physical PPU, and allocating the second job to the second collection of PPU fractions of the physical PPU. The first tenant and the second tenant can share the same physical PPU.

In some examples, the allocating of the first job to the first collection of PPU fractions is further based on a tenant isolation constraint to provide tenant isolation wherein a single tenant of the plurality of tenants is to use a PPU fraction of a physical PPU at a time. In other words, jobs of different tenants cannot be assigned to the same PPU fraction in a current job scheduling iteration, which refers to an iteration of solving a job allocation problem by a job scheduler (e.g., the GPU job scheduler 108 of FIG. 1).

In some examples, the tenant isolation constraint includes a tenant-job variable to indicate whether a respective PPU fraction of a physical PPU of the plurality of physical PPUs has been allocated to a respective tenant of the plurality of tenants. For example, the tenant-job variable is $A_{jwt}$ in constraints 1g and 1h.

In some examples, the tenant-job variable is based on variables (e.g., $x_{ijwt}$) indicating whether corresponding jobs of the respective tenant have been allocated to the respective PPU fraction.

In some examples, the tenant-job variable is based on a sum of the variables (e.g., the sum in constraint 1g) indicating whether corresponding jobs of the respective tenant have been allocated to the respective PPU fraction. For example, in constraint 1g, the tenant-job variable is $A_{jwt}$ is expressed as $\overline{N}$.

In some examples, the tenant-job variable is set to a specified value (e.g., "1" or another non-zero value) if any job of the respective tenant is assigned to the respective PPU fraction.

In some examples, the allocating of the first job to the first collection of PPU fractions is further based on a migration cost reduction objective (e.g., the second objective function of Eq. 1) to reduce a cost associated with migrating jobs between physical PPUs.

In some examples, the allocating of the first job to the first collection of PPU fractions is further based on a constraint (e.g., constraint 1c) to ensure that cumulative resources allocated to one or more jobs within a given PPU fraction does not exceed a total capacity of the given PPU fraction.

In some examples, the allocating of the first job to the first collection of PPU fractions is further based on a constraint (e.g., constraint 1d) to ensure cumulative resources allocated to one or more jobs across the multiple PPU fractions of the physical PPU does not exceed a total capacity of the physical PPU.

In some examples where the controller is part of the adapter that is separate from the CPU of the system including the plurality of physical PPUs, the adapter can transfer first job data of the first job using a DMA transfer from the adapter to a memory of the first collection of PPU fractions, and transfer second job data of the second job using a DMA transfer from the adapter to a memory of the second collection of PPU fractions.

In some examples, the adapter is to receive the first job data and the second job data from clients in RDMA transfers over a network.

Figure 4:
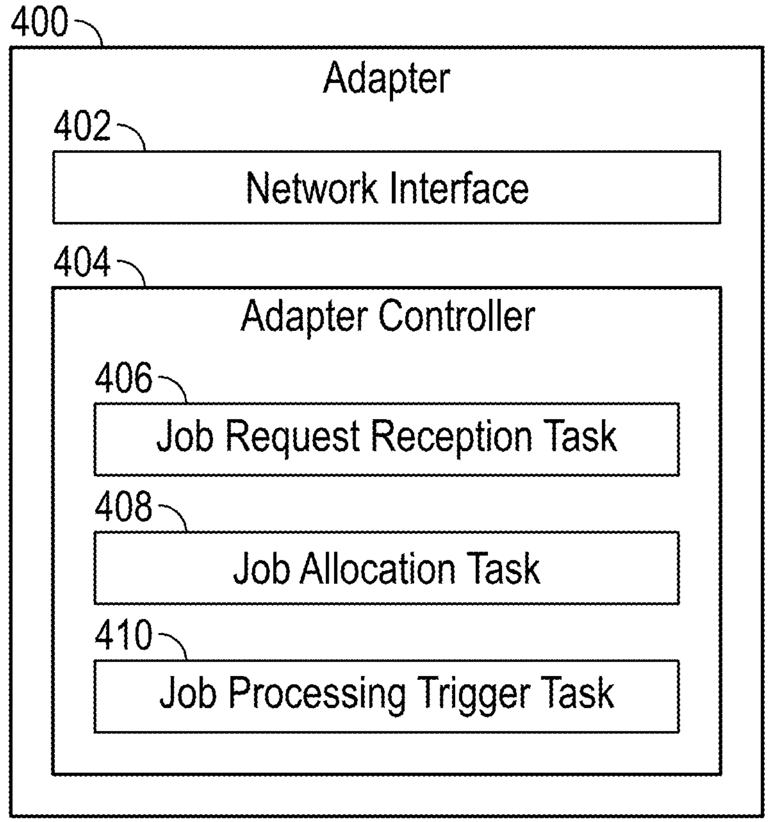
FIG. 4 is a block diagram of an adapter according to some examples.

FIG. 4 is a block diagram of an adapter 400, which can be a smart NIC or another type of electronic component. The adapter 400 includes a network interface 402 to communicate over a network, such as the network 106 of FIG. 1. The adapter 400 includes an adapter controller 404 to perform various tasks. The adapter controller 404 may separate from a CPU of a system including a plurality of physical PPUs. The adapter 400 may be part of the system or may be outside the system.

The tasks of the adapter controller 404 include a job request reception task 406 to receive, over the network, a request from a first tenant to schedule a first job in the system.

The tasks of the adapter controller 404 include a job allocation task 408 to allocate the first job to a first collection of PPU fractions of a physical PPU. The allocation is based on: an operational cost reduction objective to reduce a cost associated with a usage of the plurality of physical PPUs, and a tenant isolation constraint to provide tenant isolation wherein a single tenant of a plurality of tenants including the first tenant is to use a PPU fraction of the physical PPU at a time.

The tasks of the adapter controller 404 include a job processing trigger task 410 to trigger processing of the first job according to the allocation of the first job to the first collection of PPU fractions. Data isolation is provided between the first job allocated to the first collection of PPU fractions and a second job of a second tenant allocated to a second collection of PPU fractions of the physical PPU.

In some examples, the adapter controller 404 can allocate multiple jobs of the first tenant to a common PPU fraction of the physical PPU.

Figure 5:
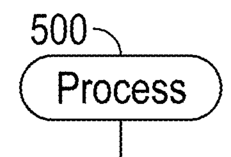
FIG. 5 is a flow diagram of a process according to some examples.

FIG. 5 is a flow diagram of a process 500 according to some examples of the present disclosure. The process 500 includes receiving (at 502), by a job scheduler executed on a controller, a request from a first tenant to schedule a first job in a system including a plurality of physical PPUs, where a physical PPU of the plurality of physical PPUs includes multiple PPU fractions, and where a first PPU fraction of the multiple PPU fractions includes a first PPU compute resource and a first PPU memory resource that is separate and isolated from a second PPU compute resource and a second PPU memory resource of a second PPU fraction of the multiple PPU fractions.

The process 500 includes allocating (at 504), by the job scheduler, the first job to a first collection of PPU fractions of the multiple PPU fractions based on objectives and at least one constraint. The objectives include an operational cost reduction objective to reduce a cost associated with a usage of the plurality of physical PPUs, and a migration cost reduction objective to reduce a cost associated with migrating jobs between physical PPUs. The at least one constraint includes a tenant isolation constraint to provide tenant isolation wherein a single tenant of a plurality of tenants including the first tenant is to use a PPU fraction of a physical PPU at a time.

The process 500 includes processing (at 506) the first job according to the allocation of the first job to the first collection of PPU fractions, where data isolation is provided between the first job of the first tenant allocated to the first collection of PPU fractions and a second job of a second tenant allocated to a second collection of PPU fractions of the multiple PPU fractions.

Adapter-Assisted Job Scheduling Control Plane

Figure 6:
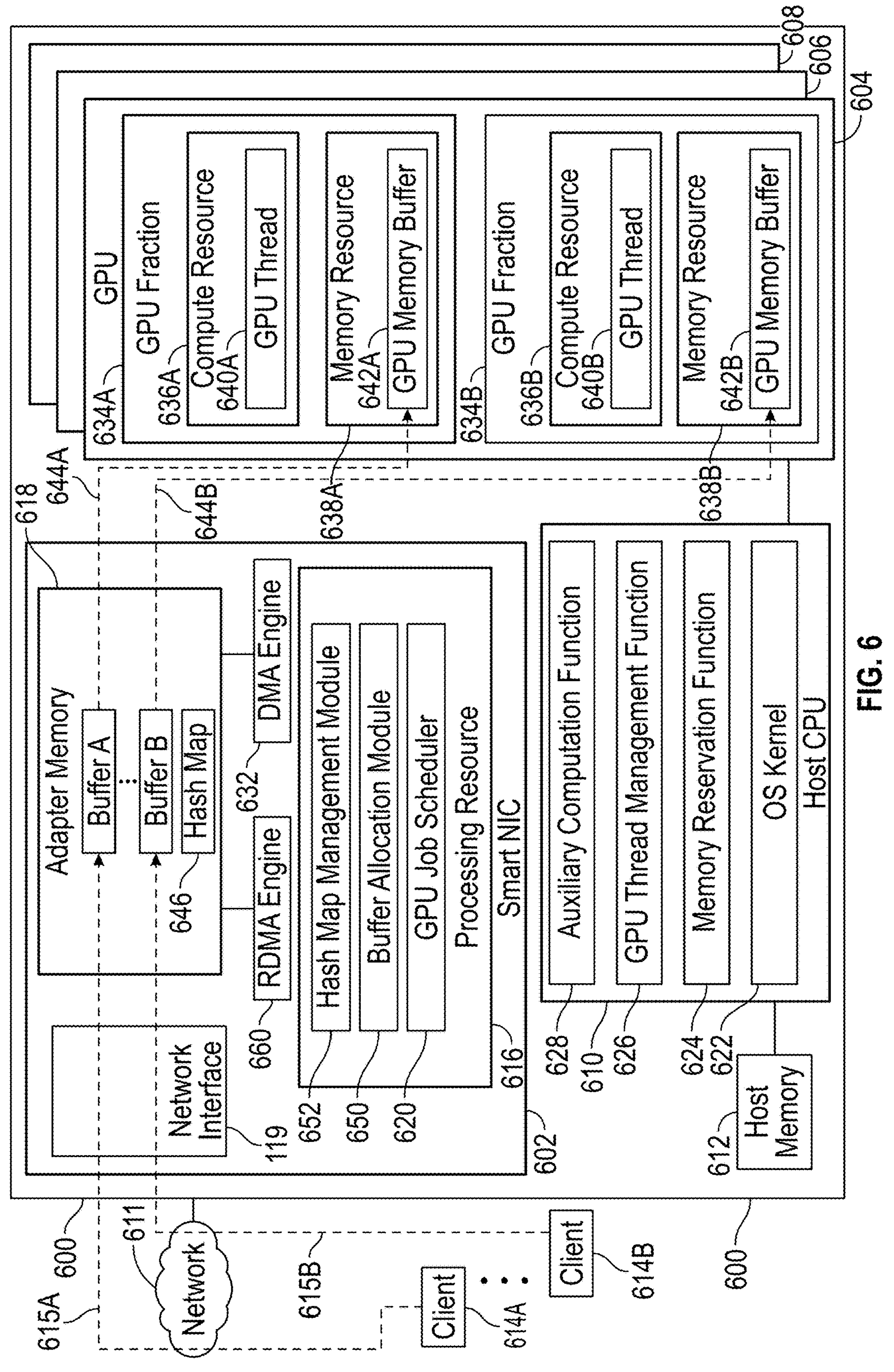
FIG. 6 is a block diagram of an arrangement including a computing system having a host central processing unit (CPU), graphics processing units (GPUs), and a smart network interface controller (NIC) that executes a GPU job scheduler according to some examples.

As discussed above, a GPU job scheduler can be executed on an adapter. In some examples, the adapter can include a smart NIC. FIG. 6 is a block diagram of an example arrangement that includes a computing system 600 and clients 614A and 614B that are able to send job requests to the computing system 600. The computing system 600 includes a smart NIC 602, multiple GPUs 604, 606, and 608, a host CPU 610, and a host memory 612. Although a specific quantity of GPUs is depicted in FIG. 6, in other examples, the computing system 600 can include a different quantity of GPUs. The host CPU 610 is separate from the smart NIC 602.

In other examples, the functionalities of the smart NIC 602 may be included in another type of adapter. In further examples, the adapter may be outside the computing system 600, such as in a network device (e.g., a switch, a router, a gateway, or another type of network device) that may be part of the network 611.

The computing system 600 is coupled over the network 611 to the clients 614A and 614B. In some examples, the client 614A is a program or an electronic device associated with a first tenant, and the client 614B is a program or electronic device associated with a second tenant different from the first tenant. Although a specific quantity of clients is shown in FIG. 6, in other examples, there may be a different quantity of clients.

The smart NIC 602 includes a processing resource 616 and an adapter memory 618 that is implemented with one or more memory devices in the smart NIC 602. The smart NIC 602 further includes a network interface 619 that is able to communicate over the network 611.

A GPU job scheduler 620 (which may be similar to the GPU job scheduler 108 of FIG. 1, for example) is executable on the processing resource 616. The GPU job scheduler 620 is able to assign jobs of clients (including the clients 614A, 614B) to GPU fractions of the GPUs 604, 606, and 608.

In addition to executing the GPU job scheduler 108, the processing resource 616 of the smart NIC 602 can also execute other machine-readable instructions, including a buffer allocation module 650 and a hash map management module 652. Although depicted as separate modules, in other examples, the GPU job scheduler 108, the buffer allocation module 650, and the hash map management module 652 may be integrated into fewer modules or partitioned into more modules.

The host CPU 610 can execute primary machine-readable instructions of the computing system 600, including an OS kernel 622. The host CPU 610 can also execute other primary machine-readable instructions, such as system firmware and application programs, for example. Additionally, the host CPU 610 can execute various functions (including machine-readable instructions) to perform specific tasks. The functions include a memory reservation function 624, a GPU thread management function 626, and an auxiliary computation function 628.

The memory reservation function 624 is able to allocate (or deallocate) GPU memory buffers in GPU fractions. Allocating a GPU memory buffer reserves a portion of the memory of a GPU for a GPU fraction. Deallocating a GPU memory buffer removes the GPU memory buffer. The GPU thread management function 626 is able to invoke GPU threads in the GPU fractions. The auxiliary computation function 628 can perform certain tasks on behalf of a GPU that the GPU may not be able to efficiently perform. For example, although a GPU is designed to perform matrix computations or other parallel processing or repetitive computations, the GPU may not be able to perform other tasks (e.g., generating messages, executing program code with conditional statements, etc.) efficiently. The auxiliary computation function 628 is able to perform such other tasks on behalf of the GPU.

Although depicted as separate functions, the memory reservation function 624, the GPU thread management function 626, and the auxiliary computation function 628 may be integrated into fewer functions or partitioned into more functions.

The clients 614A, 614B can submit job requests to the computing system 600 for executing respective jobs on the GPUs 604, 606, and 608 of the computing system 600. As part of the jobs submitted to the computing system 600, each of the clients 614A, 614B is able to perform an RDMA data transfer of job data to the adapter memory 618 of the smart NIC 602. As shown in FIG. 6, the client 614A can perform an RDMA data transfer (615A) of job data A (for job A) to adapter memory buffer A in the adapter memory 618, and the client 614B can perform an RDMA data transfer (615B) of job data B (for job B) to adapter memory buffer B in the adapter memory 618. For any given job, the job data may include job data segments received at different times from a client at the smart NIC 602. The job data segments can be processed at the computing system 600 as the job data segments are received.

The buffer allocation module 630 can allocate adapter memory buffers in the adapter memory 618 to respective clients. Each of the adapter memory buffers constitutes a local buffer provisioned to process job requests and to receive respective job data from a client. Each adapter memory buffer can be dedicated to a specific client or group of clients. In the example of FIG. 6, adapter memory buffer A is allocated to the client 614A, and adapter memory buffer B is allocated to the client 614B. Using distinct adapter memory buffers for different clients avoids contention for the adapter memory 618 by the different clients.

The smart NIC 602 includes an RDMA engine 660 to establish RDMA connections between the smart NIC 602 and respective clients. The RDMA engine 660 can establish a first RDMA connection with the client 614A, and the RDMA engine 660 can establish a second RDMA connection with the client 614B. For example, an RDMA connection can be established according to the Reliably Connected (RC) mode. Once an RDMA connection is established with a given client, the given client can perform RDMA accesses (reads and writes) of data in the adapter memory 618 of the smart NIC 602.

The smart NIC 602 additionally includes a DMA engine 632 that is able to perform DMA data transfers from adapter memory buffers to respective memory resources of GPU fractions of the GPUs 604, 606, and 608.

FIG. 6 shows two example GPU fractions 634A and 634B of the GPU 604. The other GPUs 606 and 608 can also include GPU fractions.

The GPU fraction 634A includes a compute resource 636A and a memory resource 638A. Similarly, the GPU fraction 634B includes a compute resource 636B and a memory resource 638B. A GPU thread 640A can be executed by the compute resource 636A. A GPU memory buffer 642A can be allocated in the memory resource 638B. Similarly, a GPU thread 640B can be executed by the compute resource 636B, and a GPU memory buffer 642A can be allocated in the memory resource 638B.

In examples where the GPU 604 is an NVIDIA GPU, the GPU threads 640A and 640B can include Compute Unified Device Architecture (CUDA) threads to run in a parallel computing platform and programming model of the GPU. More generally, a "GPU thread" can refer to any machine-readable instructions executable in a GPU to perform the tasks of a job.

In some examples, the DMA engine 632 can perform a DMA transfer (644A) of job data A from adapter memory buffer A in the adapter memory 618 to the GPU memory buffer 642A of the GPU fraction 634A, assuming that the GPU job scheduler 620 has assigned job A from the client 614A to the GPU fraction 634A. Similarly, the DMA engine 632 can perform a DMA data transfer (644B) of job data B from adapter memory buffer B in the adapter memory 618 to the GPU memory buffer 642B in the GPU fraction 634B, assuming that the GPU job scheduler 620 has assigned job B from the client 614B to the GPU fraction 634B. The DMA transfers of job data A to the GPU memory buffer 642A and job data B to the GPU memory buffer 642B can be performed in parallel by the DMA engine 632. The ability to transfer different job data to different GPU memory buffers allows the different job data to be delivered to GPU fractions where the different job data would be processed. After the DMA transfers, no further data movement would have to occur within a GPU for processing of the received job data.

In some examples, the hash map management module 652 can store a hash map 646 in the adapter memory 618. The hash map 646 maps respective jobs to corresponding GPU memory buffers in GPU fractions allocated by the GPU job scheduler 620 to execute corresponding jobs. The hash map 646 can keep track of allocations of GPU memory buffers to respective clients that request jobs to be executed on GPUs of the computing system 600.

The hash map at 646 includes multiple entries. An entry of the hash map 646 can map a hash value to the following pieces of information: a buffer identifier (ID) that identifies a GPU memory buffer, a buffer physical memory address of the GPU memory buffer in a GPU, and an application ID. An example of the hash map 646 is depicted in Table 2 below.

TABLE 2

(Hash Map)

| Hash Value | Buffer ID | Buffer Physical Memory Address | Application ID |
|---|---|---|---|
| 123 | 20 | Addr1 | 2 |
| | . | | |
| | . | | |
| | . | | |
| 654 | 18 | Addr2 | 5 |

A buffer ID is a value (e.g., a numeric value or an alphanumeric value) that identifies a GPU memory buffer in a GPU fraction. Different GPU memory buffers in the GPUs of the computing system 600 may be assigned different buffer IDs.

A buffer physical memory address is an address that identifies a storage location in a memory of a GPU where a GPU memory buffer is stored. An application ID is an identifier of an application (e.g., a client, an application program, an organization, etc.) associated with a job scheduled for execution in a GPU fraction. The application ID can be a numeric value or an alphanumeric value. An example of an application ID is a program ID (PID). In other examples, other types of IDs can be used to identify requesters that submitted jobs for execution.

In some examples, a hash value in the hash map 646 is generated by applying a hash function (e.g., a Secure Hash Algorithm (SHA) function) on the following pieces of information: a buffer ID, a buffer physical memory address, and an application ID. In other examples, the hash function can be applied on less than the foregoing pieces of information, or more than the foregoing pieces of information. More generally, a function is applied on information that indicates where job data is located in a GPU memory buffer to produce a mapping value that can be used by the smart NIC 602 to determine to which GPU memory buffer incoming job data from a client is to be transferred in a DMA transfer.

Entries of the hash map 646 are added or updated based on scheduling decisions made by the GPU job scheduler 620. The GPU job scheduler 620 assigns a job of a given client to a GPU fraction. The GPU job scheduler 620 can provide information identifying the GPU fraction assigned to the job to the hash map management module 652. The assigned GPU fraction includes a GPU memory buffer that has a given buffer ID and a given buffer physical memory address. The hash map management module 652 adds an entry to the hash map 646 that contains a hash value, the given buffer ID, the given buffer physical memory address, and an application ID of the given client, where the hash value is derived based on the given buffer ID, the given buffer physical memory address, and the application ID of the given client.

If the GPU job scheduler 620 changes job assignments that causes existing jobs to be re-assigned to different GPU fractions, the GPU job scheduler 620 can inform the hash map management module 652 of the newly assigned GPU fractions, and the hash map management module 652 can update entries of the hash map 646 to reflect the changed GPU fraction assignments.

As hash values are generated by the hash map management module 652, the hash map management module 652 can send the hash values to respective clients associated with respective application IDs. For example, the hash map management module 652 can send Hash1 (a first hash value) to the client 614A identified by AID1 (a first application ID), where the Hash1 is produced based on applying the hash function on BID1 (a first buffer ID of a GPU memory buffer assigned to the job of the client 614A), ADDR1 (a first physical memory address of the GPU memory buffer assigned to the job of the client 614A), and AID1. The client 614A will include Hash1 as metadata with job data sent to the smart NIC 602.

Similarly, the hash map management module 652 can send Hash2 (a second hash value) to the client 614B identified by AID2 (a second application ID), where the Hash2 is produced based on applying the hash function on BID2 (a second buffer ID of a GPU memory buffer assigned to the job of the client 614B), ADDR2 (a second physical memory address of the GPU memory buffer assigned to the job of the client 614B), and AID2. The client 614A will include Hash2 as metadata with job data sent to the smart NIC 602.

The hash map 646 is an example of mapping information stored in the adapter memory 618, where the mapping information tracks which GPU memory buffers are allocated to jobs of respective clients.

In accordance with some examples of the present disclosure, the control plane of the smart NIC 602 (where the control plane includes the processing resource 616, the RDMA engine 660, and the DMA engine 632) is able track GPU memory buffers allocated in the GPUs (by using the hash map 646 or other mapping information). The control plane of the smart NIC 602 also facilitates data transfer to and from the network 611 without using the host CPU 610 to transfer job data (i.e., the job data is not transferred through the host CPU 610).

When incoming job data is received at the smart NIC 602 (e.g., an RDMA transfer of the incoming job data to an adapter memory buffer in the adapter memory 618 is detected), the hash map management module 652 can extract metadata from the incoming job data. The extracted metadata can include a hash value, for example. The hash value extracted from the incoming job data is used to perform a lookup of the hash map 646 to retrieve an entry of the hash map 646. The entry retrieved is an entry that includes the hash value of the incoming job data. The hash map management module 652 can extract the buffer ID and buffer physical memory address from the retrieved entry, and the hash map management module 652 can provide the extracted buffer ID and buffer physical memory address to the DMA engine 632 to perform a DMA transfer of the job data from an adapter memory buffer to the GPU memory buffer at the buffer physical memory address.

When a job is completed by a GPU fraction, the GPU fraction may in some cases produce job result data that is to be sent to the client that requested the job. The job result data can include (or can be associated with) metadata that is inspected by the hash map management module 652. The metadata can include a hash value, which is used to perform a lookup of the hash map 646. The hash value maps to an entry that contains the application ID for the client that requested the job.

Figure 7:
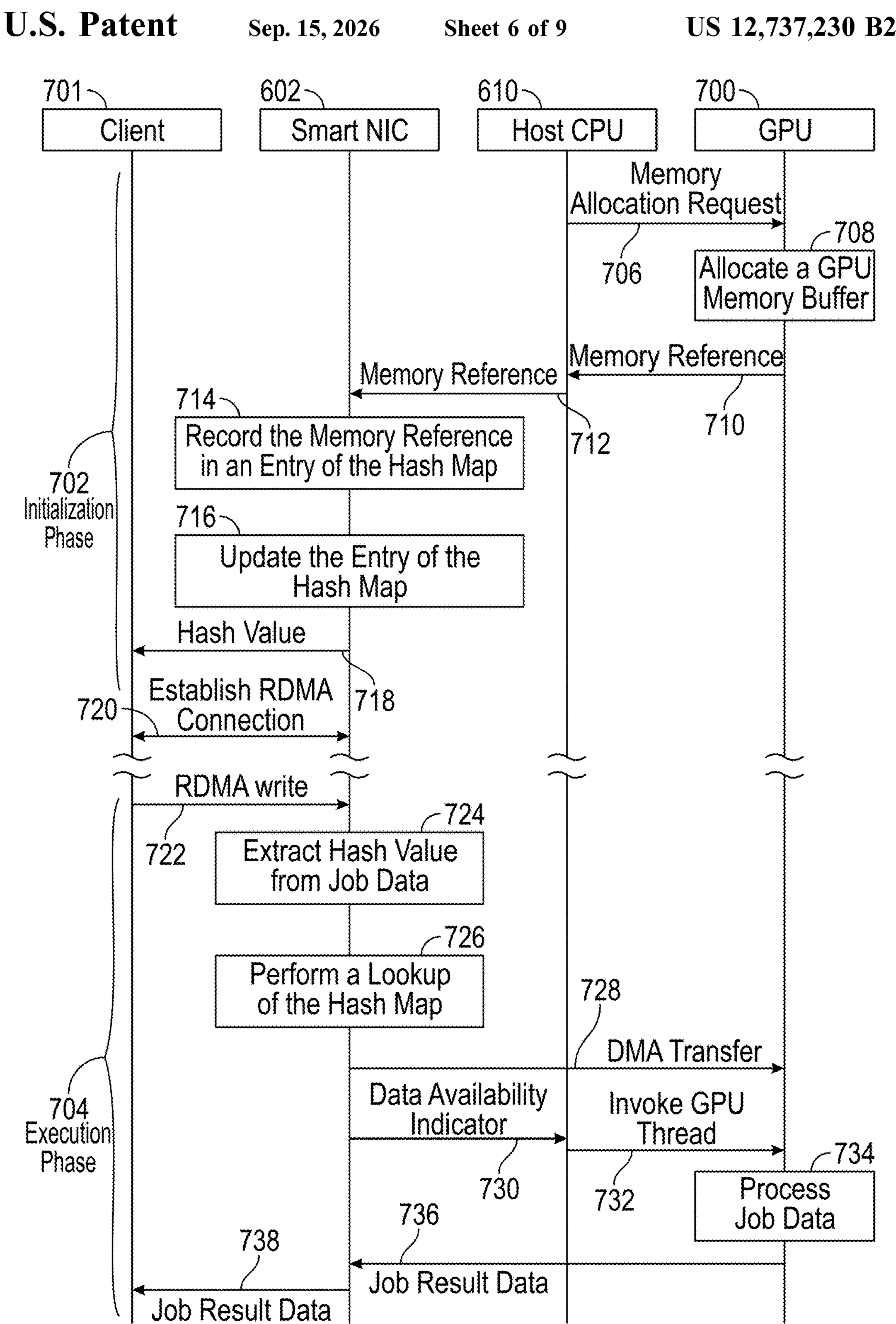
FIG. 7 is a flow diagram of a process involving a client that submits a job, a smart NIC including a GPU job scheduler to schedule the job, a host central processing unit (CPU), and a GPU on which the job is to be scheduled, in accordance with some examples.

FIG. 7 is a message flow diagram illustrating an initialization phase 702 and an execution phase 704 associated with use of GPUs to execute jobs from clients. The initialization phase 702 relates to reserving GPU memory buffers and establishing RDMA connections between the smart NIC 602 and clients, including the clients 614A, 614B. The execution phase 704 relates to transferring job data and invoking GPU threads to perform respective jobs in GPU fractions. Although FIG. 7 depicts a specific order of tasks, in other examples, the tasks can be performed in a different order, some tasks may be omitted, or other tasks may be added.

In the initialization phase 702, the memory reservation function 624 executed by the host CPU 610 issues (at 706) a memory allocation request to a GPU 700, which can be any of the GPUs 604, 606, or 608 of FIG. 6. In examples where the GPU 700 is an NVIDIA GPU, the memory allocation request can include a doca_gpu_mem_alloc function of a Data-Center-on-a-Chip (DOCA) library (an open-source library of functions) provided by NVIDIA. In other examples, the memory allocation request can be another type of request, such as a call of an application programming interface (API), or any other type of command whether proprietary, standardized, or open source.

In response to the memory allocation request, the GPU 700 allocates (at 708) a GPU memory buffer (e.g., 642A or 642B in FIG. 6) and produces a memory reference to the allocated GPU memory buffer. The memory reference can include the buffer ID and the buffer physical memory address of the allocated GPU memory buffer, for example. More specifically, the memory reference can be in the form of a memory pointer to the allocated GPU memory buffer.

The GPU 700 sends (at 710) the memory reference to the host CPU 610, which forwards (at 712) the memory reference to the smart NIC 602. In some examples, a secure communication channel can be established between the host CPU 610 and the smart NIC 602 over which the memory reference is sent. A communication channel is secure if a protection mechanism is provided to protect data over the communication channel from being accessed by an entity other than the entities connected by the communication channel. For example, the secure communication channel can include a communication link (e.g., a bus or interconnect) that is connected to the smart NIC 602 and the host CPU 610, but is isolated from other entities of the computing system 600. As another example, information transferred over the secure communication may be encrypted.

In addition to carrying memory references to allocated GPU memory buffers, the secure communication channel can also carry data availability indicators from the smart NIC 602 to the host CPU 610. A "data availability indicator" can refer to a signal, a message, an information element, or any other indicator to specify that job data has been transferred to a GPU memory buffer for processing.

In response to receiving the memory reference to the allocated GPU memory buffer, the hash map management module 652 in the smart NIC 602 records (at 714) the memory reference (including the buffer ID and the buffer physical memory address) in an entry of the hash map 646. At this point, the entry is partially populated as a job has not yet been assigned to the allocated GPU memory buffer. When a job request is received at a later time from a client (e.g., 701) and the GPU job scheduler 620 assigns the requested job to the allocated GPU memory buffer, the hash map management module can update (at 716) the partially populated entry by adding the following: the application ID associated with the client 701, and a hash value based on the buffer ID, the buffer physical memory address, and the application ID. The smart NIC 602 also sends (at 718) the hash value to the client 701. Once an entry of the hash map 646 is fully populated in response to a job request from the client 701, any subsequent RDMA transferred job data of the same job from the client 701 will be directed based on this entry to the identified GPU memory buffer.

Tasks 706 to 718 are iterated for other GPU memory buffers allocated based on memory allocation requests from the memory reservation function 624 executed by the host CPU 610.

In addition, the RDMA engine 660 establishes (at 720) an RDMA connection in advance with the client 701. The RDMA engine 660 can further establish RDMA connections with other clients. As part of establishing the RDMA connection with the client 701, the RDMA engine 660 in the smart NIC 602 provides the client 701 with information of an adapter memory buffer dedicated to the client 701. The information may include a memory address of the adapter memory buffer, for example, which can be used by the client to perform an RDMA transfer of job data to the adapter memory buffer. The adapter memory buffer temporarily stores job data before the job data is forwarded to a respective GPU fraction.

The initialization phase 702 allocates GPU memory buffers in GPU fractions and establishes RDMA connections with clients. After GPU memory buffers are allocated and RDMA connections are established, the execution phase 704 can begin. Note that both the initialization phase 702 and the execution phase 704 may be ongoing processes that can concurrently run. In other words, during the execution phase 704, the initialization phase 702 can continue to allocate more GPU memory buffers and establish more RDMA connections.

In the execution phase 704, the client 701 performs (at 722) an RDMA write of job data of a given job to the adapter memory buffer in the smart NIC 602. The hash map management module 652 extracts (at 724) a hash value from the job data and performs (at 726) a lookup of the hash map 646 to retrieve a corresponding entry from the hash map 646. From the retrieved entry, the hash map management module 652 obtains the buffer ID and the buffer physical memory address of the target GPU memory buffer of the GPU fraction assigned to the given job.

The hash map management module 652 initiates a DMA transfer of the job data by providing the buffer physical memory address of the target GPU memory buffer to the DMA engine 632. The DMA engine 632 performs (at 728) a DMA transfer of the job data to the target GPU memory buffer.

In some examples, after the DMA transfer of the job data to the target GPU memory buffer, the smart NIC 602 sends (at 730) a data availability indicator to the host CPU 610 for indicating that job data has been transferred to the target GPU memory buffer. In some examples, the smart NIC 602 may lack the ability to directly invoke a GPU thread at the GPU 700. This may be due to the smart NIC 602 being coupled to the GPU 700 indirectly through a bus switch, such as a Peripheral Component Interconnect Express (PCIe) switch. However, there is a direct connection between the GPU 700 and the host CPU 610.

In response to the data availability indicator from the smart NIC 602, the GPU thread management function 626 running on the host CPU 610 invokes (at 732) a GPU thread to run in the GPU 700 (or more specifically, in the GPU fraction assigned to the given job). The invocation of the GPU thread can be accomplished by sending a command, such as a command in the DOCA library, or any other command to trigger execution of the GPU thread. The data availability indicator can identify the GPU fraction to which the job data was sent, so the GPU thread management function 626 would be able to invoke the GPU thread in the identified GPU fraction.

The invoked GPU thread processes (at 734) the job data in the target GPU memory buffer, and produces job result data. The job result data may include output data produced by computations on the job data. Alternatively, or additionally, the job result data may include an indication of successful or failed execution of the processing of the job data. In some examples, the job result data is provided (at 736) by the GPU 700 to the smart NIC 602, which then sends (at 738) the job result data to the client 701.

For example, the GPU thread can signal the smart NIC 602 that the job result data is available. The GPU thread can provide the buffer ID and a size of the job result data to the smart NIC 602. The hash map management module 652 can perform a lookup of the hash map 646 based on the buffer ID to obtain the buffer physical memory address of the GPU memory buffer where the job result data is stored. The DMA engine 632 then performs a DMA read to transfer the job result data (having the indicated size) from the GPU memory buffer to the smart NIC 602 (such as to the adapter memory buffer for the client 701). The smart NIC 602 can then send the job result data from the adapter memory buffer to the client 701.

In other examples, instead of the GPU thread signaling the smart NIC 602 of the availability of the job result data, the GPU thread can signal the GPU thread management function 626 executed on the host CPU 610, which in turn signals the smart NIC 602.

Note that in the execution phase 704 depicted in FIG. 7, the host CPU 610 is not in the data path so that the host CPU 610 does not become a bottleneck in the data path. Rather, the host CPU 610 is part of the control path, which includes waiting on a data availability indicator and invoking a GPU thread in response.

In alternative examples, the smart NIC 602 is able to invoke a GPU thread in a GPU, in which case the host CPU 610 would not have to be involved in invoking a GPU thread to process job data transferred to a GPU memory buffer.

By performing RDMA transfers to adapter memory buffers in the smart NIC 602 and DMA transfers from the adapter memory buffers to GPU memory buffers, any latency introduced by using the adapter memory buffers may be minimized or reduced.

In accordance with some implementations of the present disclosure, an adapter such as a smart NIC is also able to translate between different formats of job data. More specifically, incoming job data from a client is according to a first format, while data processed in a GPU is according to a second format different from the first format.

For example, the incoming job data may be in a serialized format, where the data includes a stream of bits transmitted from a client to the adapter. A GPU thread running on a GPU may expect job data to be in a different format, such as in the form of a matrix or vector, a linked list, a hierarchical arrangement of data (e.g., a tree), a table, or any other data structure that has an arrangement of data different from the arrangement of the incoming job data.

Figure 8:
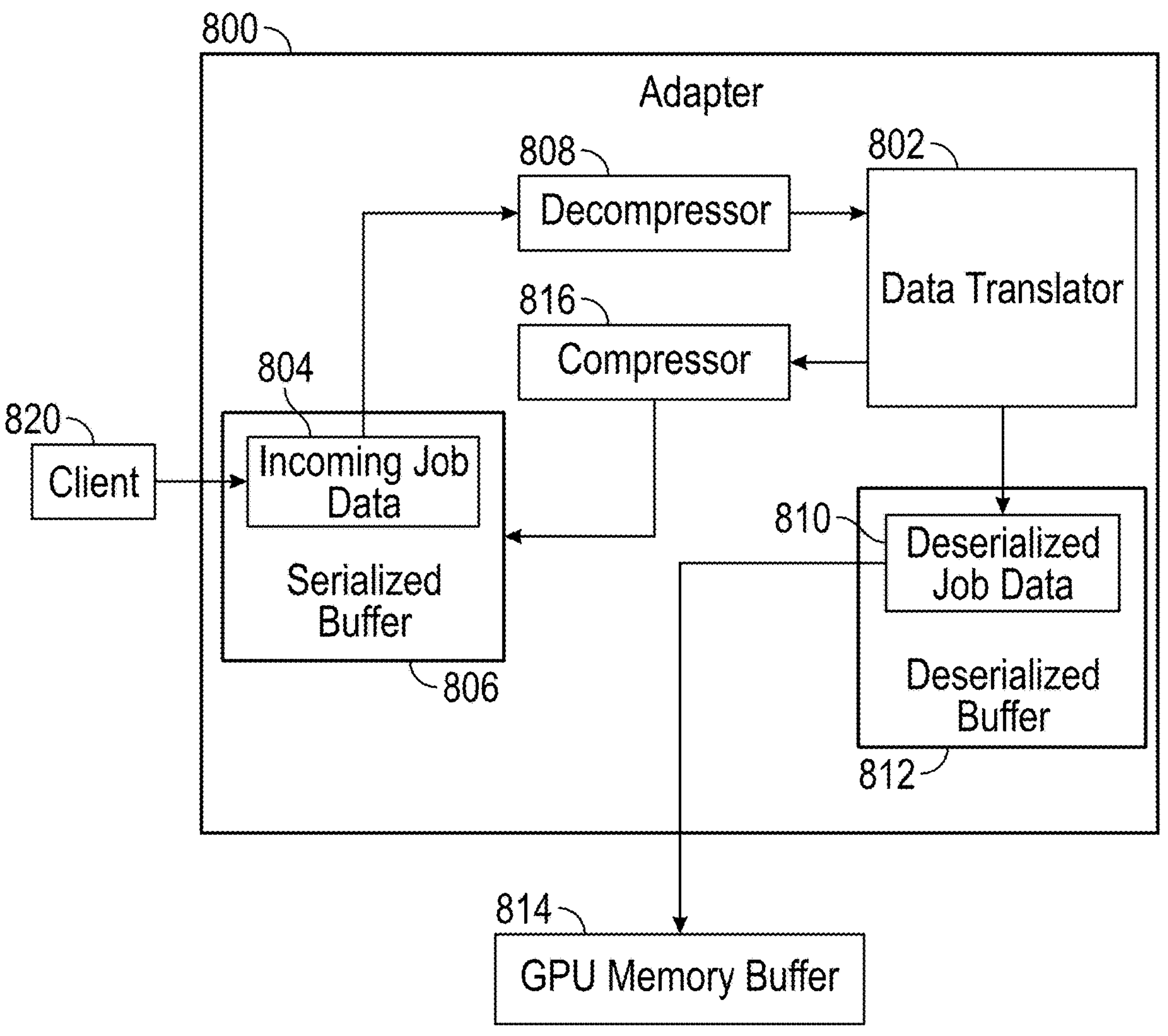
FIG. 8 is a block diagram of an arrangement including an adapter and a GPU memory buffer, according to some examples.

As shown in FIG. 8, an adapter 800 (such as a smart NIC or another type of adapter) can include a data translator 802 to translate between different data formats. Incoming job data 804 (in serialized format) from a client 820 is received (e.g., as part of an RDMA transfer) in a serialized buffer 806, which may be an example of the adapter memory buffer A or B in the adapter memory 618 of FIG. 6.

In some examples, the incoming job data 804 may also be compressed. In such examples, the adapter 800 includes a decompressor 808 to decompress the compressed incoming job data 804. The decompressed job data is provided to the data translator 802, which converts the decompressed job data from the serialized format to deserialized job data 810 according to a deserialized format. The deserialized job data 810 is stored in a deserialized buffer 812.

Data in a "deserialized format" refers to data that has an arrangement that differs from a serial stream of bits. The deserialized format may be in the form of a matrix or vector, a linked list, a hierarchical arrangement of data (e.g., a tree), a table, or any other data structure that is more complex than a serial stream of bits. The adapter 800 can transfer (e.g., using a DMA transfer) the deserialized job data 810 from the deserialized buffer 812 to a GPU memory buffer 814 for processing by a GPU thread in a GPU fraction.

In the reverse direction, job result data produced by the GPU thread may have the deserialized format. The job result data having the deserialized format can be transferred from the GPU memory buffer 814 to the deserialized buffer 812, and the data translator 802 can serialize the job result data into a serialized format. The job result data in the serialized format is provided to a compressor 816, which compresses the serialized job result data and stores the compressed, serialized job result data in the serialized buffer 806. The adapter 800 can then send the compressed, serialized job result data to the client 820.

In further examples, incoming job data may further be encrypted with an encryption key. In such examples, the adapter 800 may include decryption logic to apply decryption on the incoming job data. In the reverse direction, the adapter 800 may include an encryption logic to encrypt job result data before sending the job result data to the client 820.

In other examples, the incoming job data may be in the form of a binary blob. A binary blob includes a collection of binary data. However, the GPU thread may expect job data in an application object format. The data translator 802 can convert job data between a binary blob and the application object format.

As another specific example, the incoming job data may be in a specific image format, such as a Joint Photographic Experts Group (JPEG) format, while the GPU thread may process image data according to a bitmap format. In such an example, the data translator 802 can convert image data between the JPEG format and the bitmap format.

Performing data translations at the adapter 800 instead of in a GPU allows for more efficient usage of the resources of the adapter 800 and the GPU. Although the GPU may be efficient in performing matrix computations or other parallel processing or repetitive computations, the GPU may not be able to efficiently perform data translations, data compression or decompression, and/or data encryption or decryption.

The data translator 802, the decompressor 808, and the compressor 816 can be implemented as hardware processing circuitry in the adapter 800, or as machine-readable instructions executable by a processing resource of the adapter 800.

Any encryption and decryption logic in the adapter 800 can also be implemented as hardware processing circuitry in the adapter 800, or as machine-readable instructions executable by the processing resource of the adapter 800.

In some examples, a smart NIC that includes a job scheduler, an RDMA engine, and a DMA engine may be an "off-path" smart NIC. A processing resource (e.g., 616 in FIG. 6) of the off-path smart NIC is outside the data path of incoming data received by the smart NIC. For example, in FIG. 6, the data path of incoming job data from the clients 614A and 614B includes adapter memory buffers in the adapter memory 618, but not the processing resource 616.

Figure 9:
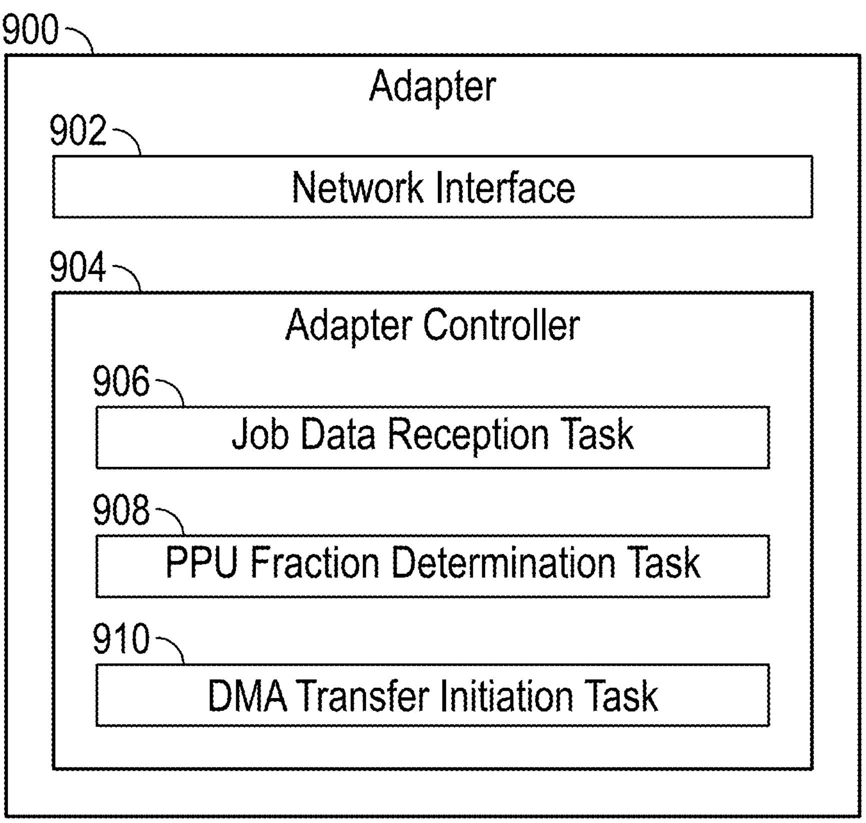
FIG. 9 is a block diagram of an adapter according to further examples.

FIG. 9 is a block diagram of an adapter 900 according to some examples. The adapter 900 is for a system including a plurality of physical PPUs. The adapter 900 may be part of the system or may be outside the system.

The adapter 900 includes a network interface 902 to communicate over a network, and an adapter controller 904 to perform various tasks. The tasks of the adapter controller 904 include a job data reception task 906 to receive, over the network, job data for multiple jobs to be executed on PPU fractions of one or more physical PPUs. The job data may be received in RDMA transfers from clients, for example.

The tasks of the adapter controller 904 include a PPU fraction determination task 908 to determine that first job data of a first job of the multiple jobs is to be provided to a first PPU fraction of the PPU fractions, and that second job data of a second job of the multiple jobs is to be provided to a second PPU fraction of the PPU fractions.

The tasks of the adapter controller 904 include a DMA transfer initiation task 910 to initiate a DMA transfer of the first job data to a first PPU memory buffer of the first PPU fraction, and a DMA transfer of the second job data to a second PPU memory buffer of the second PPU fraction. For example, in FIG. 6, the hash map management module 652 initiates a DMA transfer of the job data by providing the buffer physical memory address of the target GPU memory buffer to the DMA engine 632, which performs the DMA transfer.

In some examples, a job scheduler is executable by the adapter controller 904 to allocate the multiple jobs to the PPU fractions, where data isolation is provided between the first job allocated to the first PPU fraction and the second job allocated to the second PPU fraction.

In some examples, the job scheduler is executable by the adapter controller to allocate the multiple jobs to the PPU fraction based on one or more objectives, where the one or more objectives are selected from among an operational cost reduction objective to reduce a cost associated with a usage of the one or more physical PPUs, or a migration cost reduction objective to reduce a cost associated with migrating jobs between physical PPUs. The job scheduler can allocate jobs further based on constraints, such as constraints 1a to 1i discussed above.

In some examples, the adapter 900 includes an adapter memory, such as the adapter memory 618 of FIG. 6. The adapter controller 904 provides adapter memory buffers in the adapter memory for respective clients that submitted the multiple jobs. A first adapter memory buffer receives (e.g., in an RDMA transfer) the first job data of the first job from a first client, and a second adapter memory buffer receives (e.g., in an RDMA transfer) the second job data of the second job from a second client.

In some examples, the adapter 900 is separate from a CPU of the system. Responsive to a completion of the DMA transfer of the first job data of the first job to the first PPU memory buffer of the first PPU fraction, the adapter controller 904 notifies (such as with a data availability indicator) the CPU of the completion to cause invocation of machine-readable instructions (e.g., a thread) by the CPU at the one or more physical PPUs to process the first job data.

In some examples, the adapter controller 904 retrieves, from the CPU, a result of the processing of the first job data, the result retrieved using a DMA transfer from the first PPU memory buffer of the first PPU fraction. The result can include job result data.

In some examples, the adapter controller 904 receives an indication from a PPU or from the CPU that the result is available at the first PPU memory buffer. The adapter controller 904 initiates the DMA transfer from the first PPU memory buffer in response to the indication.

In some examples, the adapter controller 904 receives a first memory address of the first PPU memory buffer of the first PPU fraction reserved by the CPU, and receives a second memory address of the second PPU memory buffer of the second PPU fraction reserved by the CPU. The reservation of the PPU memory buffers may be performed by the GPU thread management function 626 of FIG. 6, for example.

In some examples, the adapter controller 904 stores the first memory address and the second memory address in respective entries of mapping information (e.g., the hash map 646 of FIG. 6) that contain buffer identifiers of respective PPU memory buffers and memory addresses of the respective PPU memory buffers. The mapping information tracks allocations of PPU memory buffers in the one or more physical PPUs to jobs of respective clients. Responsive to receiving the first job data of the first job, the adapter controller 904 performs a lookup of the mapping information to obtain the first memory address for accessing the first PPU memory buffer, where the DMA transfer of the first job data to the first PPU memory buffer uses the first memory address obtained from the mapping information.

In some examples, each respective entry of the mapping information further includes a mapping value derived by applying a function (e.g., a hash function) on a memory address and a buffer identifier of a PPU memory buffer (and possibly on other information such as an application ID). The first job data is associated with metadata including a first mapping value, and the lookup of the mapping information uses the first mapping value to retrieve an entry of the mapping information.

In some examples, the adapter controller 904 receives, over the network, the first job data of the first job according to a first format and translates the first job data according to the first format to converted job data according to a second format different from the first format. The DMA transfer of the first job data to the first PPU memory buffer includes a DMA transfer of the converted job data to the first PPU memory buffer.

In some examples, the first format is a serial format, and the first job data includes a serial stream of data. The translating includes deserializing the first job data into the converted job data according to the second format.

Figure 10:
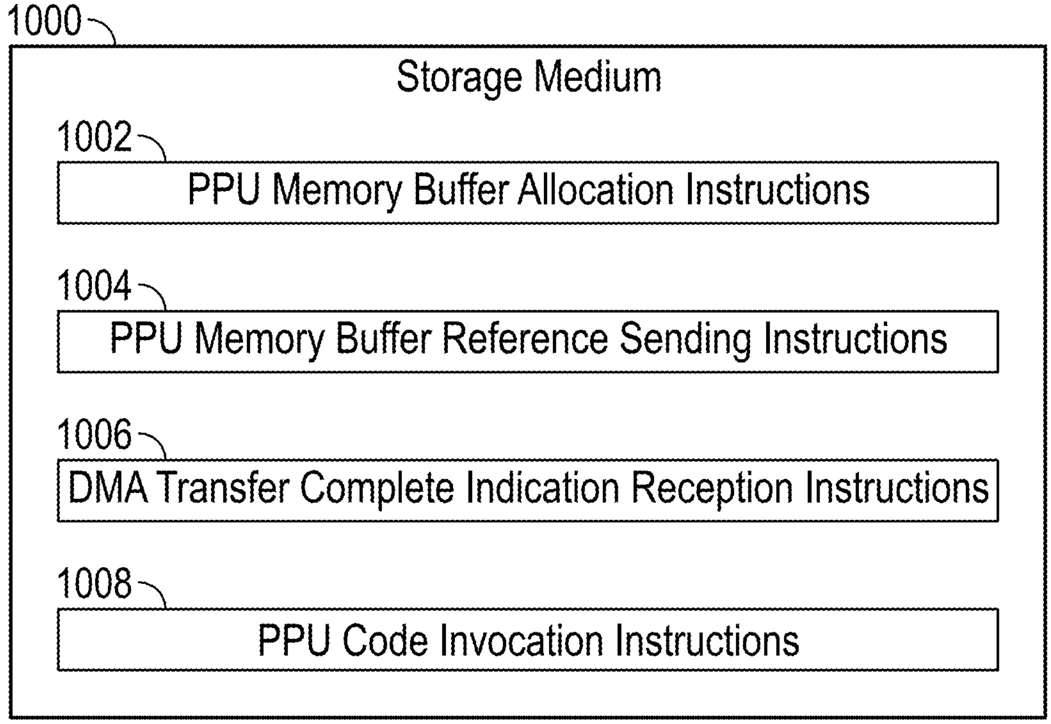
FIG. 10 is a block diagram of a storage medium storing machine-readable instructions executable by a host CPU, according to some examples.

FIG. 10 is a block diagram of a non-transitory machine-readable storage medium 1000 storing machine-readable instructions that upon execution cause a host CPU of a system to perform various tasks.

The machine-readable instructions in the storage medium 1000 include PPU memory buffer allocation instructions 1002 to allocate PPU memory buffers in respective PPU fractions of one or more physical PPUs. For example, the host CPU can send a command to allocate the PPU memory buffers.

The machine-readable instructions in the storage medium 1000 include PPU memory buffer reference sending instructions 1004 to send, to an adapter, references to the PPU memory buffers for association in mapping information to jobs from clients. The adapter is separate from the host CPU. An example of the mapping information is the hash map 646 of FIG. 6, and the references can include buffer IDs and buffer physical memory addresses. In some examples, the mapping information is populated with the references to the PPU memory buffers and identifiers (e.g., application IDs) indicating the clients based on job scheduling of jobs to the PPU fractions by a job scheduler executed by the adapter.

The machine-readable instructions in the storage medium 1000 include DMA transfer complete indication reception instructions 1006 to receive, from the adapter, an indication of a DMA transfer of job data of a job from the adapter to a first PPU memory buffer of a first PPU fraction of the PPU fractions. The indication can include a data availability indicator, for example.

The machine-readable instructions in the storage medium 1000 include PPU code invocation instructions 1008 to, based on the indication, invoke machine-readable instructions in the first PPU fraction to process the job data in the first PPU memory buffer.

Figure 11:
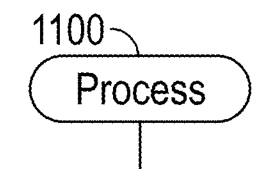
FIG. 11 is a flow diagram of a process according to further examples.

FIG. 11 is a flow diagram of a process 1100 according to some examples of the present disclosure. The process 1100 may be performed by an adapter, such as a smart NIC.

The process 1100 includes receiving (at 1102), by an adapter over a network: first job data of a first job transferred from a first client in a first RDMA transfer to a first adapter memory buffer in an adapter memory of the adapter, and second job data of a second job transferred from a second client in a second RDMA transfer to a second adapter memory buffer in the adapter memory.

The process 1100 includes determining (at 1104), by the adapter, that the first job data is to be provided to a first PPU fraction of one or more physical PPUs, and that the second job data is to be provided to a second PPU fraction of the one or more physical PPUs. This determination can be based on mapping information such as the hash map 646 of FIG. 6.

The process 1100 includes performing (at 1106) a DMA transfer of the first job data from the adapter to a first PPU memory buffer of the first PPU fraction, and a DMA transfer of the second job data from the adapter to a second PPU memory buffer of the second PPU fraction. The DMA transfer can be performed by a DMA engine in the adapter.

The process 1100 includes receiving (at 1108), by the adapter, a first result of processing of the first job data by a first compute resource in the first PPU fraction, and a second result of processing of the second job data by a second compute resource in the second PPU fraction.

As used here, a "collection" of items can refer to a single item or multiple items. A "computer" can refer to any or some combination of the following: a server computer, a desktop computer, a notebook computer, or any other type of computing device. A "controller" can refer to a processing resource, such as a hardware processor including a microprocessor, a core of a multi-core microprocessor, a microcontroller, a programmable integrated circuit, a programmable gate array, or another hardware processing circuit.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

Machine-readable instructions executable on a hardware processor can refer to the instructions executable on a single hardware processor or the instructions executable on multiple hardware processors.

A storage medium (e.g., 300 in FIG. 3 or 1000 in FIG. 10) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An adapter for a system comprising a plurality of physical parallel processing units (PPUs), the adapter comprising:

a network interface to communicate over a network; and an adapter controller to:

receive, over the network, job data for multiple jobs to be executed on PPU fractions of one or more physical PPUs, determine that first job data of a first job of the multiple jobs is to be provided to a first PPU fraction of the PPU fractions, and that second job data of a second job of the multiple jobs is to be provided to a second PPU fraction of the PPU fractions, and initiate a direct memory access (DMA) transfer of the first job data to a first PPU memory buffer of the first PPU fraction, and a DMA transfer of the second job data to a second PPU memory buffer of the second PPU fraction.

2. The adapter of claim 1, comprising a job scheduler executable by the adapter controller to allocate the multiple jobs to the PPU fractions, wherein data isolation is provided between the first job allocated to the first PPU fraction and the second job allocated to the second PPU fraction.

3. The adapter of claim 2, wherein the job scheduler is executable by the adapter controller to allocate the multiple jobs to the PPU fractions based on one or more objectives, the one or more objectives selected from among an operational cost reduction objective to reduce a cost associated with a usage of the one or more physical PPUs, or a migration cost reduction objective to reduce a cost associated with migrating jobs between physical PPUs.

4. The adapter of claim 1, further comprising:

an adapter memory, wherein the adapter controller is to provide adapter memory buffers in the adapter memory for respective clients that submitted the multiple jobs, and wherein a first adapter memory buffer of the adapter memory buffers is to receive the first job data of the first job from a first client, and a second adapter memory buffer of the adapter memory buffers is to receive the second job data of the second job from a second client.

5. The adapter of claim 4, wherein the first job data is received in a Remote Direct Memory Access (RDMA) transfer from the first client to the first adapter memory buffer, and the second job data is received in a RDMA transfer from the second client to the second adapter memory buffer.

6. The adapter of claim 1, wherein the adapter is separate from a central processing unit (CPU) of the system, and the adapter controller is to:

responsive to a completion of the DMA transfer of the first job data of the first job to the first PPU memory buffer of the first PPU fraction, notify the CPU of the completion to cause invocation of machine-readable instructions by the CPU at the one or more physical PPUs to process the first job data.

7. The adapter of claim 6, wherein the adapter controller is to:

retrieve, at the adapter from the CPU, a result of the processing of the first job data, the result retrieved using a DMA transfer from the first PPU memory buffer of the first PPU fraction.

8. The adapter of claim 7, wherein the adapter controller is to:

receive an indication from a physical PPU of the one or more physical PPUs or from the CPU that the result is available at the first PPU memory buffer; and initiate the DMA transfer from the first PPU memory buffer in response to the indication.

9. The adapter of claim 1, wherein the adapter controller is to:

receive a first memory address of the first PPU memory buffer of the first PPU fraction reserved by a central processing unit (CPU) of the system, and receive a second memory address of the second PPU memory buffer of the second PPU fraction reserved by the CPU.

10. The adapter of claim 9, wherein the adapter controller is to:

store the first memory address and the second memory address in respective entries of mapping information that contain buffer identifiers of respective PPU memory buffers and memory addresses of the respective PPU memory buffers, the mapping information tracking allocations of PPU memory buffers in the one or more physical PPUs, and responsive to receiving the first job data of the first job, perform a lookup of the mapping information to obtain the first memory address for accessing the first PPU memory buffer, wherein the DMA transfer of the first job data to the first PPU memory buffer uses the first memory address obtained from the mapping information.

11. The adapter of claim 10, wherein each respective entry of the entries of the mapping information further comprises a mapping value derived by applying a function on a memory address and a buffer identifier of a PPU memory buffer, wherein the first job data is associated with metadata comprising a first mapping value, and wherein the lookup of the mapping information uses the first mapping value to retrieve an entry of the mapping information.

12. The adapter of claim 1, comprising a smart network interface controller (NIC) including the network interface and the adapter controller.

13. The adapter of claim 1, wherein the adapter controller is to:

receive, over the network, the first job data of the first job according to a first format, and translate the first job data according to the first format to converted job data according to a second format different from the first format, wherein the DMA transfer of the first job data to the first PPU memory buffer comprises a DMA transfer of the converted job data to the first PPU memory buffer.

14. The adapter of claim 13, wherein the first format is a serial format, and the first job data comprises a serial stream of data, and wherein the translating comprises deserializing the first job data into the converted job data according to the second format.

15. The adapter of claim 1, wherein the adapter is separate from a central processing unit (CPU) of the system, and the CPU is not in a data path of the DMA transfer of the first job data to the first PPU memory buffer of the first PPU fraction, and the DMA transfer of the second job data to the second PPU memory buffer of the second PPU fraction.

16. The adapter of claim 1, comprising one or more of logic to compress and decompress data associated with jobs executed by the one or more physical PPUs, or logic to encrypt or decrypt data associated with the jobs.

17. A non-transitory machine-readable storage medium storing instructions that upon execution cause a host central processing unit (CPU) of a system to:

allocate parallel processing unit (PPU) memory buffers in respective PPU fractions of one or more physical PPUs;

send, to an adapter, references to the PPU memory buffers for association in mapping information to jobs from clients, wherein the adapter is separate from the host CPU;

receive, from the adapter, an indication of a direct memory access (DMA) transfer of job data of a job from the adapter to a first PPU memory buffer of a first PPU fraction of the PPU fractions; and based on the indication, invoke machine-readable instructions in the first PPU fraction to process the job data in the first PPU memory buffer.

18. The non-transitory machine-readable storage medium of claim 17, wherein the mapping information is populated with the references to the PPU memory buffers and identifiers indicating the clients based on job scheduling of jobs to the PPU fractions by a job scheduler executed by the adapter.

19. A method comprising:

receiving, by an adapter over a network:

first job data of a first job transferred from a first client in a first remote direct memory access (RDMA) transfer to a first adapter memory buffer in an adapter memory of the adapter, and second job data of a second job transferred from a second client in a second RDMA transfer to a second adapter memory buffer in the adapter memory;

determining, by the adapter, that the first job data is to be provided to a first parallel processing unit (PPU) fraction of one or more physical PPUs, and that the second job data is to be provided to a second PPU fraction of the one or more physical PPUs;

performing a direct memory access (DMA) transfer of the first job data from the adapter to a first PPU memory buffer of the first PPU fraction, and a DMA transfer of the second job data from the adapter to a second PPU memory buffer of the second PPU fraction; and receiving, by the adapter, a first result of processing of the first job data by a first compute resource in the first PPU fraction, and a second result of processing of the second job data by a second compute resource in the second PPU fraction.

20. The method of claim 19, wherein the determining that the first job data is to be provided to the first PPU fraction and that the second job data is to be provided to the second PPU fraction is based on looking up a hash map at the adapter, the hash map comprising a plurality of entries that track PPU memory buffers to jobs from clients.

* * * * *